US007536705B1

(12) United States Patent
Boucher et al.

(10) Patent No.: US 7,536,705 B1
(45) Date of Patent: May 19, 2009

(54) SYSTEM AND METHOD FOR INTERACTIVE DISTRIBUTION OF SELECTABLE PRESENTATIONS

(75) Inventors: Antoine Boucher, London (CA); James Lee Fischer, Scottsdale, AZ (US); Allan Erik Lodberg, London (CA)

(73) Assignee: TVWorks, LLC, Philadelphia, PA (US)

( * ) Notice: Subject to any disclaimer, the term of this patent is extended or adjusted under 35 U.S.C. 154(b) by 0 days.

(21) Appl. No.: 09/255,052

(22) Filed: Feb. 22, 1999

(51) Int. Cl.
  *H04N 5/445* (2006.01)
  *H04N 7/16* (2006.01)
  *G06F 13/00* (2006.01)
  *G06F 3/00* (2006.01)
(52) U.S. Cl. .......................... 725/112; 725/51; 725/136
(58) Field of Classification Search ......... 725/112–114, 725/109–110, 136, 51; H04N 7/173
  See application file for complete search history.

(56) References Cited

U.S. PATENT DOCUMENTS

| | | | | |
|---|---|---|---|---|
| 4,163,254 A | * | 7/1979 | Block et al. | 380/233 |
| 4,163,255 A | * | 7/1979 | Pires | 380/233 |
| 4,829,372 A | | 5/1989 | McCalley et al. | |
| 5,014,125 A | | 5/1991 | Pocock et al. | 358/86 |
| 5,119,188 A | | 6/1992 | McCalley et al. | |
| 5,195,092 A | | 3/1993 | Wilson et al. | |
| 5,422,674 A | * | 6/1995 | Hooper et al. | 725/105 |
| 5,485,221 A | * | 1/1996 | Banker et al. | 348/563 |
| 5,666,487 A | | 9/1997 | Goodman et al. | |
| 5,671,377 A | * | 9/1997 | Bleidt et al. | 715/723 |
| 5,701,582 A | * | 12/1997 | DeBey | 725/103 |
| 5,721,815 A | | 2/1998 | Ottesen et al. | |
| 5,815,793 A | * | 9/1998 | Ferguson | 725/131 |
| 5,850,218 A | * | 12/1998 | LaJoie et al. | 725/45 |
| 5,929,849 A | * | 7/1999 | Kikinis | 725/113 |
| 5,961,603 A | * | 10/1999 | Kunkel et al. | 709/225 |

(Continued)

FOREIGN PATENT DOCUMENTS

WO  WO 95/15658  6/1995

(Continued)

OTHER PUBLICATIONS

S.F. Chang et al., "Development of Columbia's Video on Demand testbed", Signal Processing:Image Communication 8 (1996), pp. 191-207.

(Continued)

*Primary Examiner*—Hunter B. Lonsberry
(74) *Attorney, Agent, or Firm*—Banner & Witcoff, Ltd.

(57) ABSTRACT

A data storage, multiplexing, and distribution method is provided for use in a digital data distribution system. The system provides simultaneous transmission of a plurality of uniquely identified, independent data streams within an assigned channel bandwidth of local, metropolitan and wide area distribution media. The independent data streams can include presentations specifically requested by the receiving user. Upon request from some number of users from their premises, the system assembles a combination of optional image elements such as motion and still frame video, background and descriptive audio, text and graphical overlays into presentation data streams appropriate to the user requests. Individual data streams are multiplexed within a higher bandwidth data stream for simultaneous delivery within the bandwidth assigned for this data transmission. The techniques unique to the system, in regard to storage, timing and synchronization, can be implemented using techniques described within the MPEG profile.

17 Claims, 10 Drawing Sheets

U.S. PATENT DOCUMENTS

| | | | |
|---|---|---|---|
| 5,982,445 A * | 11/1999 | Eyer et al. | 348/461 |
| 6,184,878 B1 * | 2/2001 | Alonso et al. | 725/109 |
| 6,351,471 B1 * | 2/2002 | Robinett et al. | 370/468 |
| 6,751,802 B1 * | 6/2004 | Huizer et al. | 725/90 |

FOREIGN PATENT DOCUMENTS

| | | |
|---|---|---|
| WO | WO 98/56188 | 12/1998 |

OTHER PUBLICATIONS

A. Profumo et al., "Comparative Analysis of MPEG and ATM Multiplexing Functions For Multimedia Interactive Services" Computer Communications 20 (1997), pp. 106-114.

* cited by examiner

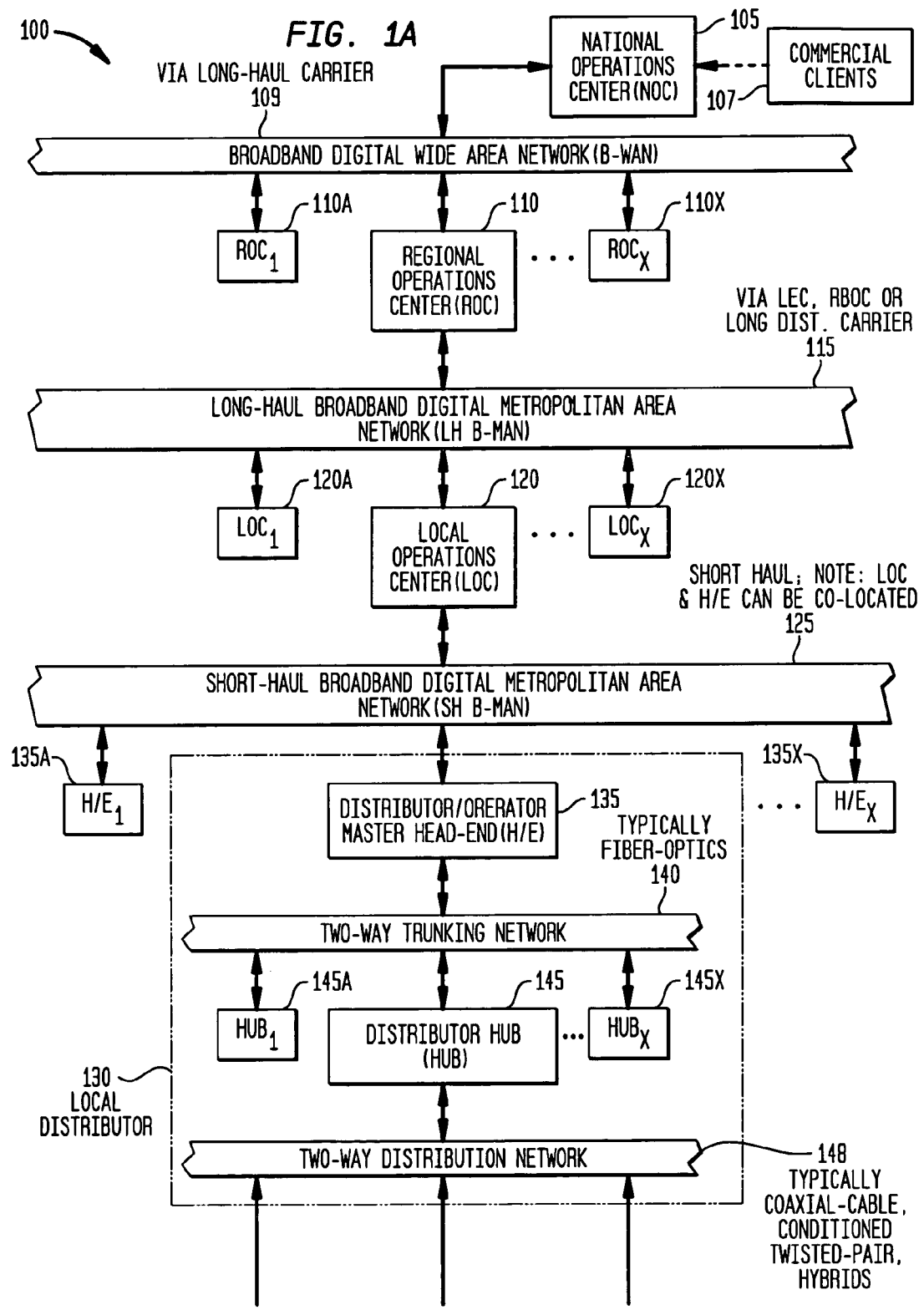

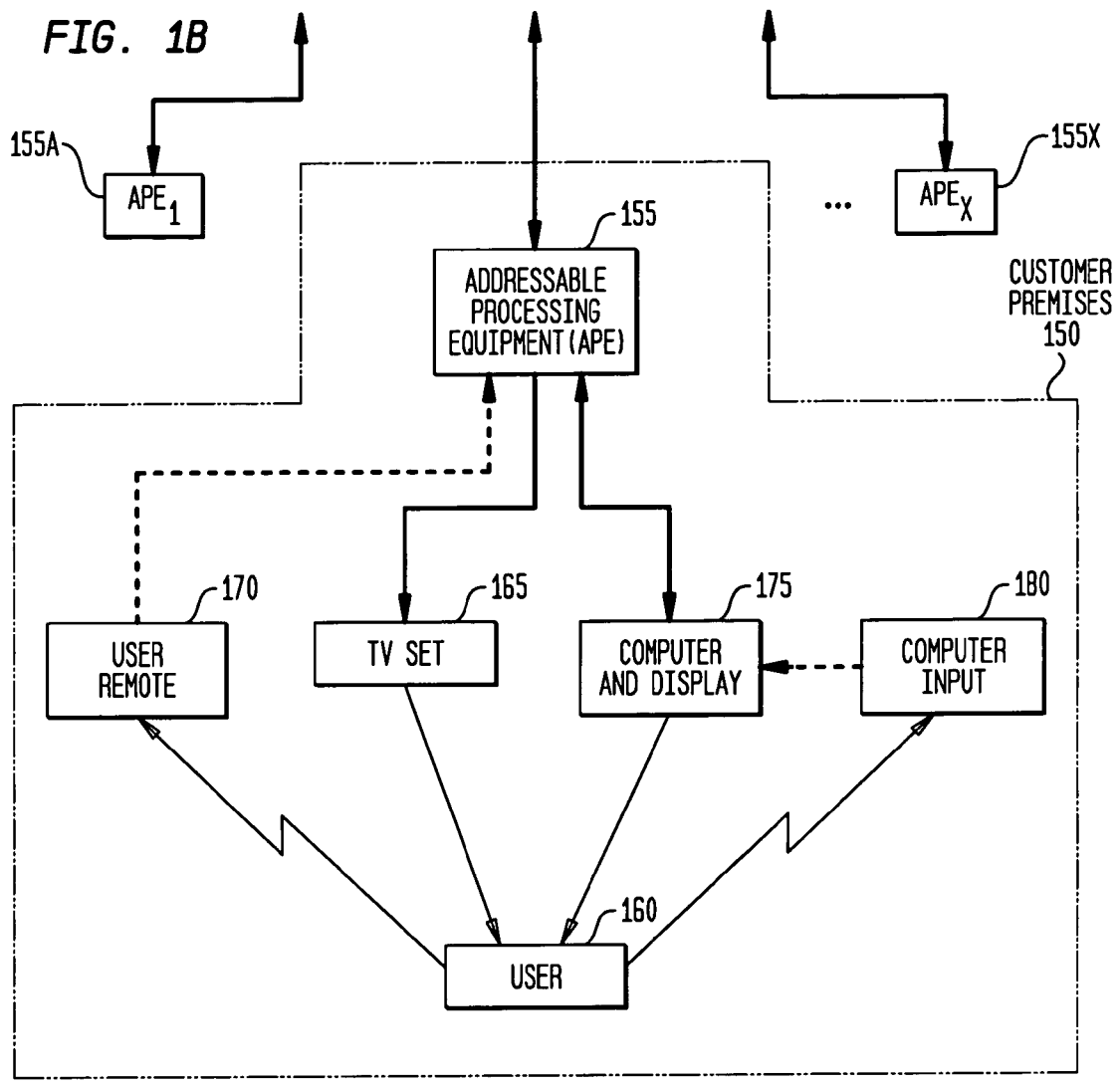

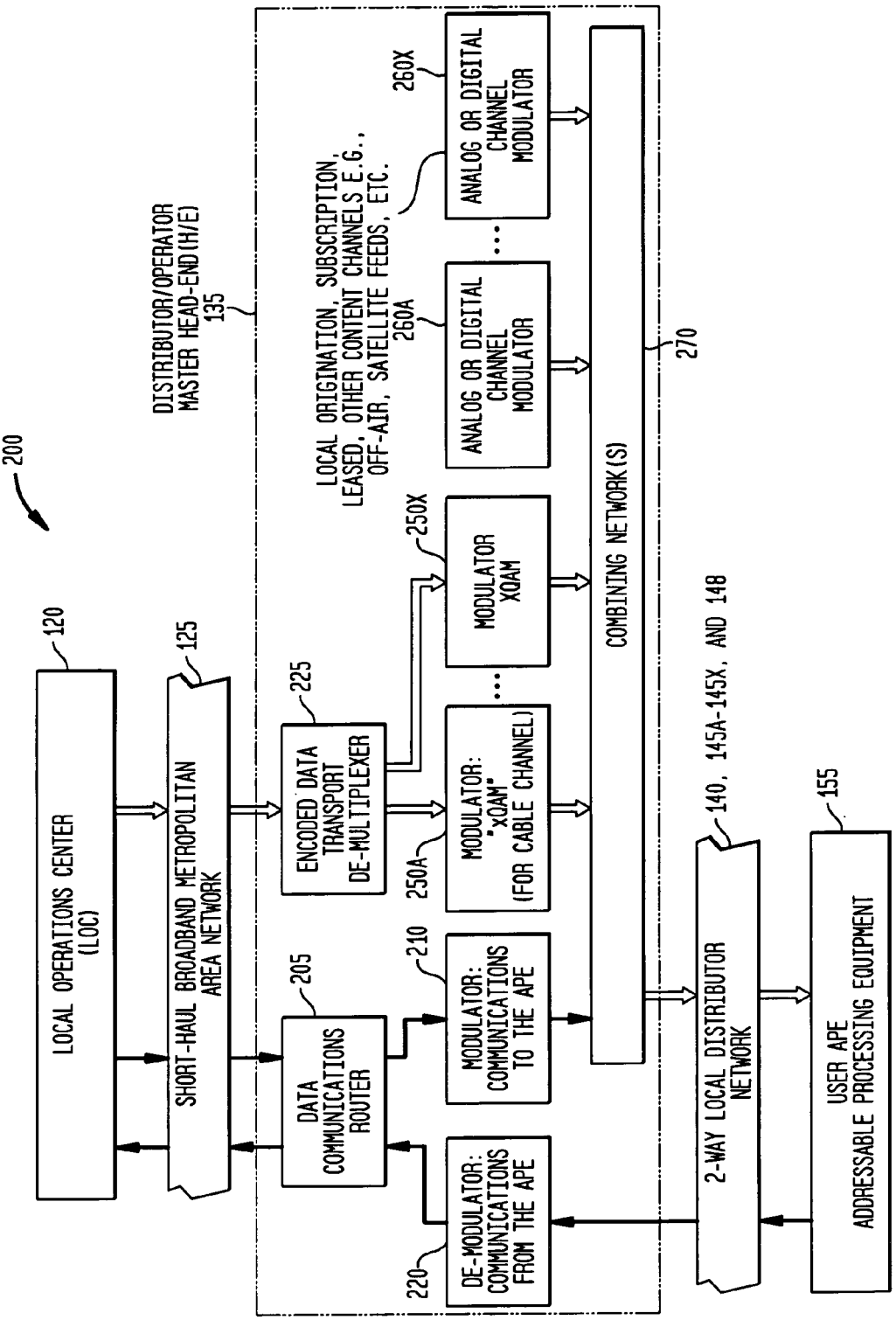

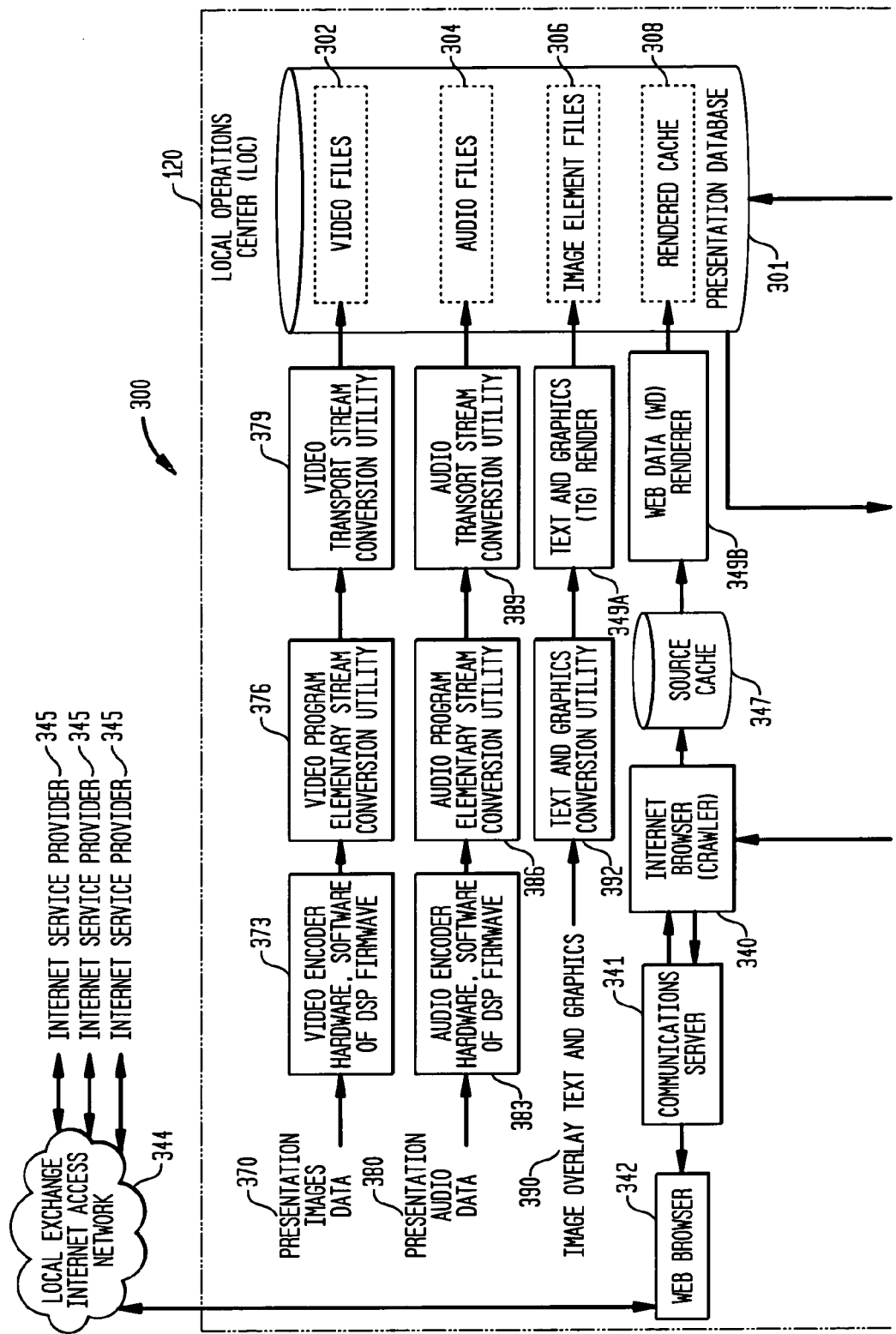

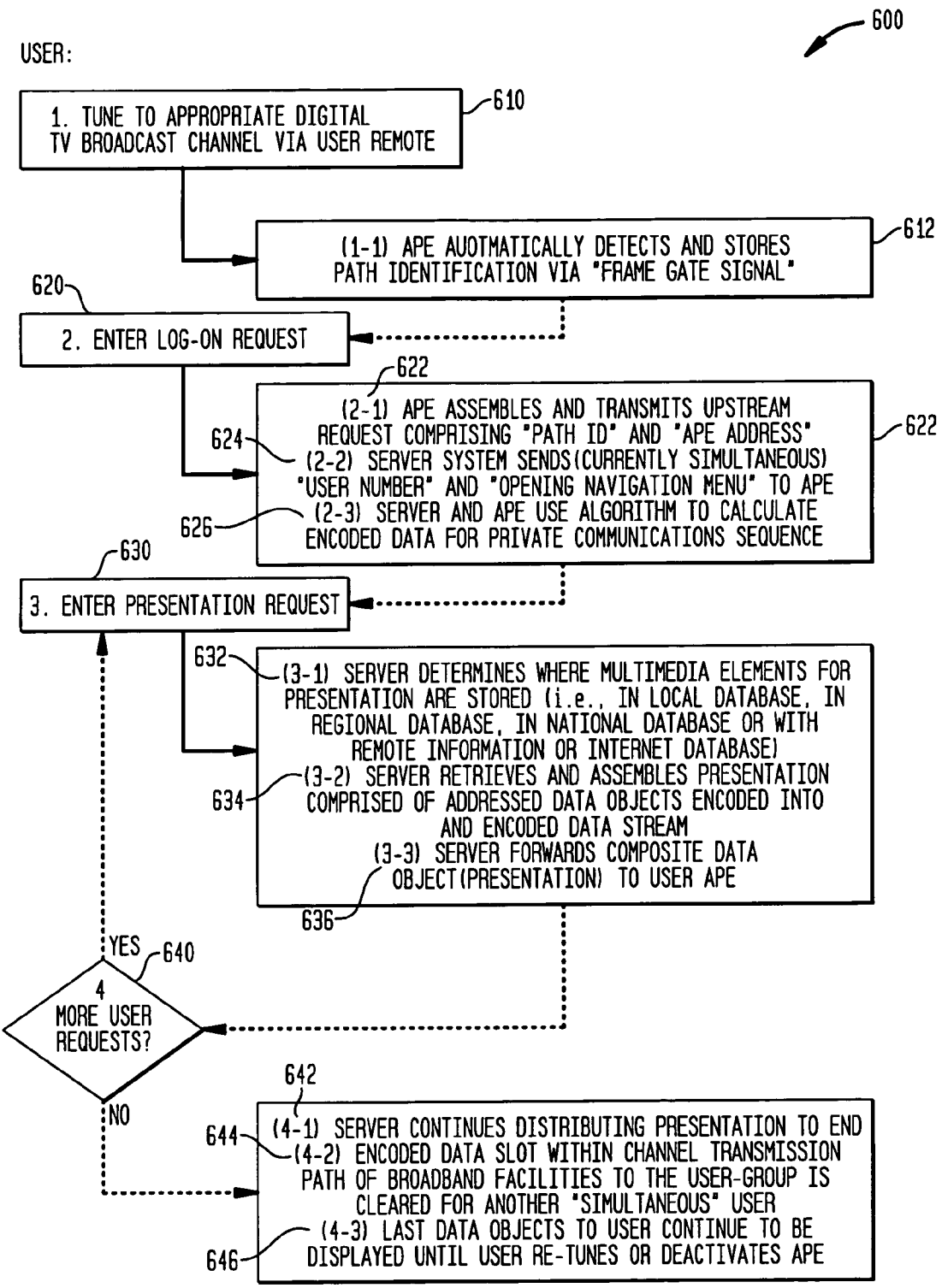

SYSTEM AND METHOD FOR INTERACTIVE DISTRIBUTION OF SELECTABLE PRESENTATIONS

BACKGROUND OF THE INVENTION

1. Field of the Invention

The present invention is generally directed to interactive systems for selectively distributing multimedia presentations to viewers at the time the viewers submit requests for the presentations. The invention is concerned with systems where a user tunes a device, such as a television set or personal computer, to a predetermined channel frequency within any of a number of suitable transmission media, and selects one from a large number of program or service options via an upstream communications path through which navigation is implemented.

2. Description of Related Art

A variety of communication systems are available to provide voice, data, image and video services to system users. The distribution media can be twisted-pair; coaxial or fiber-optic cable; or terrestrial or satellite over-the-air transmission. The communication system can be "two-way," comprised of like media, or a hybrid. For example, a hybrid system can include broadcast or cable media to the user and telephone from the user. Twisted-pair facilities can be used in a bi-directional mode to distribute data-objects, or images, of high information content (millions of binary digits). However, as the information content grows, the time to transmit the information to the remote terminal also grows to an often impractical delay for such bi-directional twisted-pair facilities.

Broadband techniques via coaxial cable and fiber-optics appear to promise the better, long-term solutions. In particular, interactive cable television systems have been developed to distribute information on demand, including entertainment and information programming, education, catalog shopping and financial transactions. Generally, a subscribing user of such a system sends a signal indicative of desired information to a central location, at which a scripted presentation is assembled. The scripted presentation is uniquely addressed to the requesting user, and directed to equipment located at the user premises. Such interactive cable television systems have been described in U.S. Pat. No. 4,734,764, granted to Pocock et al. on Mar. 29, 1988. In one embodiment of the U.S. Pat. No. 4,734,764 patent, individually addressed video frames are assembled at the server into a non-contiguous variant of the 30 frame-per-second, video transmission standard, as defined for the United States by the National Television Standards Committee (NTSC). The 30 frame per second NTSC approach is also encountered elsewhere in the world, but a variety of alternatives are also employed. Those seen most often are the 25 frame per second repetition rates mandated by the European standards Phase Alternation Line-rate (PAL) and SEquential Color And Memory (SECAM).

The video frames, defined by the governing standard, are individually retrieved from a suitable video storage medium, and each frame contains an embedded address that uniquely identifies addressable processing apparatus in the system to which the requesting viewer is connected, such as the video frame store described below. All presentations, as sequentially and/or simultaneously requested by users, are assembled and multiplexed into an NTSC video stream for transmission to users through an over-the-air channel, or through a channel within cable facilities. Addressable frame storage means can be located anywhere between the central storage/assembly area and the user-premises. The storage means can be located, for example, at transmission nodes within a cable television distribution system, or they may be located within television receiving devices at the premises of the user requesting the service. The system disclosed in the U.S. Pat. No. 4,734,764 patent provides a practical approach that enables the selective distribution of video presentations to be implemented economically within a conventional television system having a finite number of available channels.

The U.S. Pat. No. 4,734,764 describes the interactive distribution of still-frame video and accompanying audio along with overlay graphics through a television distribution system to a television set in the home of a user. The transmission can be accomplished by antennae located at both the distribution point and the user's home, by a satellite with retransmission to a home user's "dish," by a coaxial-cable network, a fiber-optic cable, via a fiber-optic and coaxial-cable hybrid, or by some other transmission means.

The U.S. Pat. No. 4,734,764 patent also describes a reception/processing/formatting device known as a video frame store, or "frame grabber" (some of this description is provided from column 12, line 64 through column 14, line 43 of the U.S. Pat. No. 4,734,764). The frame-grabber can be shared among a number of users, or assigned to a single user. In either case, the video frame store has means to store and forward either a single video frame, or a motion picture sequence of specified duration, depending upon the storage (or buffering) capacity of the frame store in question. The storage location is uniquely addressed to the requesting user. Identification codes assigned to users can be encoded within the vertical blanking interval of an NTSC video frame, or embedded within an in-band or out-of-band control stream directed to the frame stores.

In a preferred embodiment, the video frame store has means to receive, from either a primary or a secondary path, an audio accompaniment to the video. The frame store can be at either a primary or secondary distribution node, or on the customer premises, as described in more detail in U.S. Pat. No. 5,014,125, granted to Pocock et al. on May 7, 1991. Alternatively, the frame store can be part of either the user's television set or an ancillary television converter system, provided by either the user, an over-the-air distribution company, or a Community Antenna Television or Cable TV (CATV) operator.

Increased functionality and effectiveness of the U.S. Pat. No. 4,734,764 system is provided by U.S. Pat. No. 4,792,849, granted to McCalley et al. on Dec. 20, 1988. The U.S. Pat. No. 4,792,849 describes a "digital" embodiment for accomplishing the objectives of the U.S. Pat. No. 4,734,764 within a distributed-network architecture. The system employs a network interface through which user-requests are received at a local area network (LAN) within a central site. Data processors dedicated to user-session tasks are also operatively connected to the central site LAN. The user session tasks include subscriber identification, navigation, maintaining usage logs, and the large scale storage and retrieval of digitally formatted multi-media presentations of products, services and information. Distribution from the central site is typically performed within the digital facilities of a broadband distributor such as a CATV operator. Digital to analog conversion of the requested multimedia presentations can be accomplished at the user premises, or at suitably equipped nodes within the CATV (or other) system. Nodes can be located at the CATV head-end or at distribution hubs within the CATV distribution network.

U.S. Pat. No. 4,829,372, granted to McCalley et al. on May 9, 1989 discloses a presentation player for receiving a stream of digital packets, including packets assembled similarly to the scheme described in the U.S. Pat. No. 4,792,849. The packets can be transmitted over-the-air or through a cable distribution trunk. The receipt of the digital packets can occur at a device located either at a distribution system node or at the premises of a requesting user. Destination addresses appear within the header of each packet. Upon receipt at each destination to which they were uniquely addressed, the packets are converted into a video presentation with accompanying audio and are forwarded to the requesting user.

It is desirable to build upon the fundamental principles disclosed in the U.S. Pat. Nos. 4,734,764, 4,792,849 and 4,829,372 and their derivatives. There is a need for a distribution method and system that uses the video channel in an economic manner and minimizes user contention as the number of users in the system increases. This need is not addressed by distribution systems and methods disclosed in the background art.

SUMMARY OF THE INVENTION

The invention selectively distributes presentations to requesting users. The presentations can include a broad range of subject matter and presentation elements, such as video, audio, graphics, and data. Limited forms of motion video can now include sequences of panning, zooming and live motion. The invention enables a user, in the comfort of his home, to browse a large number of products, services and entertainment from which he derives information in the detail he desires, and provides capability for potential purchase of selected offerings. More particularly, the invention provides an interactive, multimedia storage, presentation assembly and delivery system in which all presentation elements are stored, processed and communicated to the user locality as "images" in a digital format, i.e., as "data objects."

The audio portion of a presentation is available in two ways, either or both of which can be made available. The audio portion can be directly associated with a still-frame or motion video image; this can take the form of descriptive information or can represent the speech of displayed characters. The second way that audio can be used is as a background element of a presentation. Background audio can be music or speech made available with or without video. The background element audio can take the form of instructions to the user, or can be an audio line—news, weather, stock info, entertainment, etc.—made available to either an individual user or to a simultaneous superset of users.

The invention expands the utility of improved addressable processing equipment, providing the "presentation player" functionality, as part of an interactive communications system adapted for merchandising products and services to users. The invention provides additional software and firmware within existing components of a given remote terminal (including a display device) adapted for use within a digital, interactive communication system. The system transmits a variety of addressable presentations to system users. The presentations can include still-frame images, motion video, and any of a number of selectable elements such as audio accompaniment, graphics and overlay data and information. The invention processes video, audio and graphics/command data in a digital format designed to provide the highest quality pictures and sound within the least transmission bandwidth.

Other objectives of the invention are:
to provide means for the expansion of services in an economic fashion (for example, the capabilities as herein described can be incrementally added as one-time downloads of software to appropriately configured addressable processing equipment provided by others);
to assist users in accessing more of the available programming by distributing navigational "pages," "frames" or "windows";
to improve security and privacy of presentations selected by users through the use of digital encryption techniques; and
to provide a system that is easy to install at the viewer location because capabilities are made available without the need for additional hardware at the user premises.

The purpose of the present invention is to provide systems including novel applications of digital techniques to accomplish the objectives listed above. In particular, U.S. Pat. No. 5,195,092 granted to Wilson et al. on Mar. 16, 1993, describes a multiplexing and distribution system wherein several independent data information streams are integrated within a high-speed, data communications, transport stream. This transport stream can be wholly contained within the six megahertz (MHz) bandwidth of a conventional, NTSC analog channel.

One very successful implementation of such a transport stream is represented by the international standard for high quality video developed by the Moving Pictures Experts Group of the International Standards Organization and the International Telecommunications Union, and known as MPEG-2. The MPEG-2 transport stream can be encoded to efficiently use the bandwidth of a particular channel.

One aspect of the invention provides a method for distributing individually selectable presentations via a complex network from a presentation preparation system to remote client terminals (e.g., addressable processing equipment). The presentation preparation system is also referred to herein as a server complex. The method includes establishing a bi-directional communications connection between a first remote client and the presentation preparation system, and transmitting a user identification and an indication of a transmission path from the remote client to the presentation preparation system. The method continues by transmitting to the presentation preparation system an indication of a user selection of a first presentation, and receiving an encoded digital data stream including portions of the first presentation.

The first presentation includes selectable data objects including multimedia elements. The user identification includes a destination address corresponding to the first remote client.

The method can also include the presentation preparation system retrieving selectable data objects corresponding to the first presentation from data sources, transforming the data objects into addressed data objects, assembling an encoded digital data stream formatted for processing by the first remote client, and transmitting the encoded digital data stream to the first remote client. The transforming of the data objects into addressed data objects includes the presentation preparation system assigning and attaching the destination address and the transmission path indication to the data objects.

The encoded digital data stream is formatted for processing by the first remote client. The encoded digital data stream includes the addressed data objects. The encoded digital data stream is transmitted from the presentation preparation system to the first remote client over the transmission path as was identified by the client.

In one embodiment, a user initiates a session by tuning a remote client "terminal," i.e., addressable processing equipment, to a "channel frequency" corresponding to the location of one or more digital information sources. Upon receipt of a server identification signal, referred to herein as a "frame gate signal," a response from the user terminal is triggered.

Each of the remote clients is adapted to respond to the server identification signal. The response can include the user identification that is comprised of a destination address of the user addressable processing equipment (APE) and an indication of the network transmission path from server to APE. The presentation preparation system is adapted to receive inputs from simultaneous users. The inputs include requests of selected presentations. The selected presentations include multimedia elements.

A second aspect of the invention provides a system, referred to herein as the InDiSPensible system, which includes a presentation preparation system, input and output devices, one or more signal processors, and a bi-directional communications complex network. The presentation preparation system has processing resources adapted to prepare, store, process and transmit digital data corresponding to presentations. Digital data transmitted by the presentation preparation system processing resources includes encoded digital data streams. The presentation preparation system also has processing resources adapted to respond to a user input by performing transactions related to the presentations.

The signal processors have network destination addresses, and are adapted to receive, store and process the encoded digital data streams. The inputs and the encoded digital data streams include the signal processor network destination addresses. The signal processors are also adapted to convert the encoded digital data corresponding to the selected presentations into converted digital data. The converted digital data having formats suitable for the display equipment with which the addressable processing equipment is associated. The display equipment can be a television, a personal computer, or recording equipment.

The bi-directional communications network is adapted to connect the users' addressable processing equipment to the appropriate presentation preparation system. The presentation preparation system can be co-located at a local distributor's head-end, or independently implemented at a Local Operations Center, a Regional Operations Center or the National Operations Center of an Information- or Service Provider.

BRIEF DESCRIPTIONS OF THE FIGURES

A more complete understanding of the invention can be made by reference to the following drawings.

FIG. 1 illustrates a typical distribution hierarchy according to the inventions system for interactive distribution of selectable presentations.

FIG. 2 illustrates the functionality and data flow, according to some embodiments of the invention, within a local broadband distributor's "head-end."

FIG. 6 illustrates the system process flow from the perspective of equipment at the user premises.

DETAILED DESCRIPTION

Figure 3B:
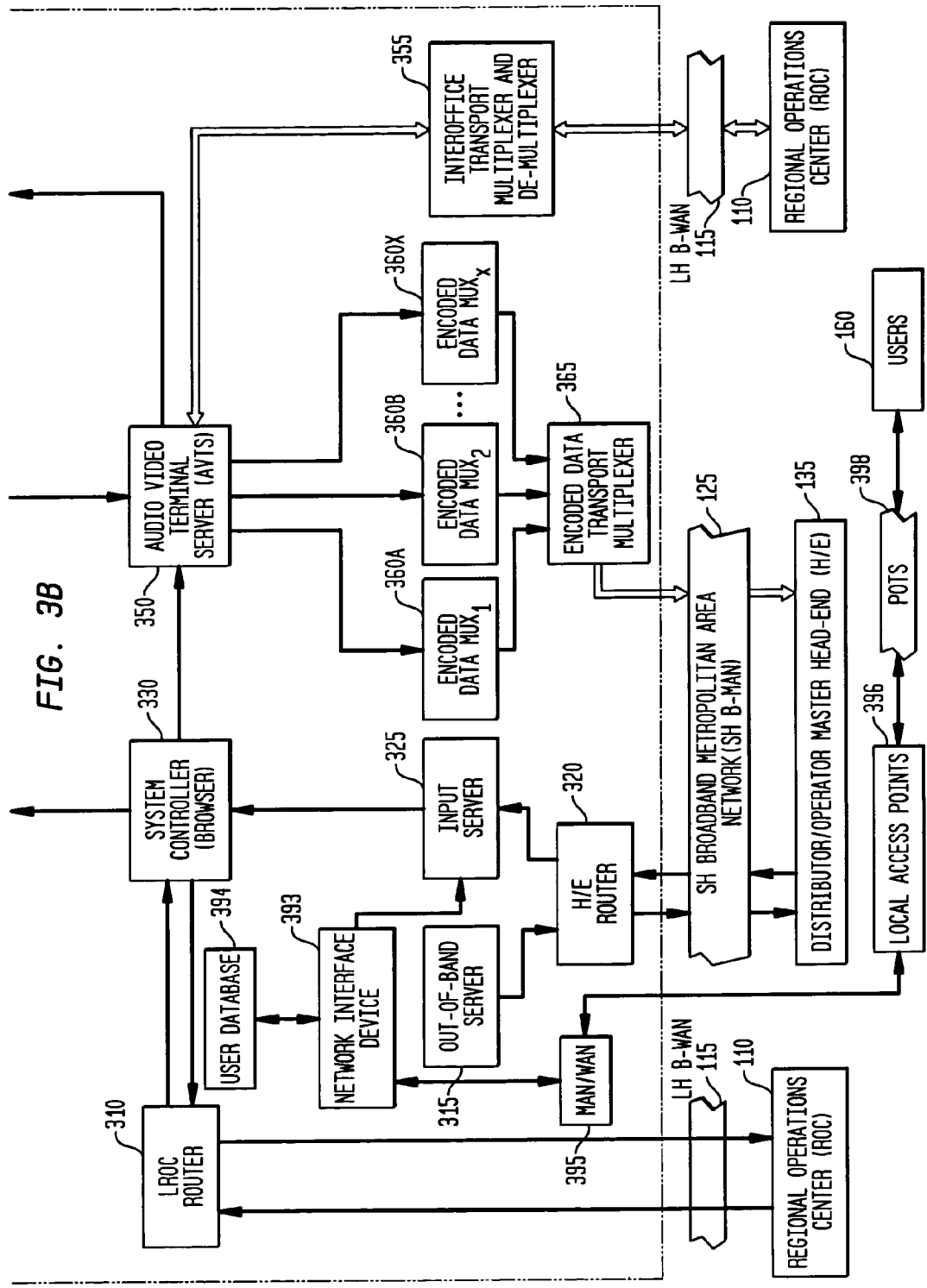
FIG. 3 illustrates a server complex implemented according to one embodiment of the invention and the data flow and communications within a local operations center.

The invention and the various features and advantageous details thereof are explained more fully with reference to the non-limiting embodiments that are illustrated in the accompanying drawings and detailed in the following description. The structured hierarchy described herein represents one of a number of technical architectures that can be used in different embodiments of the invention.

The invention can be implemented using some network topologies that are more centralized and other network topologies that are more distributed. One example of a distributed topology is encountered in the Internet environment, where a myriad of independently owned and maintained servers are geographically dispersed around the world. Descriptions of well-known components and processing techniques are omitted so as not to unnecessarily obscure the invention in detail.

FIGS. 1 through 6 illustrate a method for interactive distribution of selectable multimedia presentations to many users in different geographical locations according to the present invention. Those skilled in the art will recognize that the illustrations show only those elements necessary to understanding the essential functionality required herein. Such items as optical and radio-frequency transmitters and receivers, as well as other active and passive electrical devices, and broadband network architectural elements have been omitted to clarify illustration of principles and processes.

The invention provides simultaneous transmission of a plurality of uniquely identified, independent data streams within an assigned channel bandwidth of local, metropolitan and wide area distribution media. The independent data streams can include presentations specifically requested by the receiving user. Prior art distribution systems continuously download data to a user set-top box, and the user interrogates the set-top box memory to view a selected presentation. In the prior art the selected presentation is one of a number of presentations that is available to a number of subscribers. The invention provides private presentations specifically prepared at, and distributed from, presentation preparation server complexes.

Elements of the method and system for interactive distribution of selectable presentations include:

1) A method and apparatus for establishing a communications path and for requesting a data-object or a "presentation" (i.e., a composite data object);

2) A method for assembling an encoded digital data stream representative of a presentation from a central repository of image elements such as video, audio and dynamic video overlays. The encoded digital data stream includes a "presentation" made up of image elements appropriate to satisfy the request of the user;

3) A method and apparatus for generating addressed encoded digital data streams including a system controller to associate a destination address and a transmission path for the data-object;

4) A method and apparatus for multiplexing and distributing a plurality of encoded digital data streams within a single broadband data stream for transport across wide-area and metropolitan-area networks to the eventual distribution medium passing the requesting user;

5) A bi-directional distribution network; and,

6) A method and apparatus for displaying the requested presentation.

Some of the novel aspects of the preferred embodiment include the enhancements made available by the application of encoding technologies (such as those employed by the MPEG profiles), the multiplexing process, a central repository that is independent of the authoring tool (e.g., Hypertext Mark Up Language, or HTML) used to create the image elements, and the linking of user requests to repositories external to the central repository of the primary information provider.

The description of the method and system for interactive distribution of selectable video presentations with audio described within this disclosure is eased with the definition of the following related terms.

DEFINITIONS

1) Addressable Processing Equipment:

Addressable processing equipment (APE) comprises equipment in the distribution network from the presentation system that has processing resources and can selectively retrieve signals, i.e., packets of data, from a data stream in the network based on destination addresses attached to the signals. Some examples of addressable processing equipment found in the distribution network are: radio-frequency and optical transmission equipment used to route, switch and process bi-directional information through the trunking and distribution networks between a user and his information source, digital and analog cable set-top boxes, network- or user-sited frame stores, presentation players, computer plug-in network interface cards, cable modems, etc.

2) Data Object:

A data object represents the essential unit of information used by the system, and is a generic term for any string of data. The data object string generally includes the information to be communicated, and structural information about the data string. For example, structural information can include the length of the complete object along with its packet and header description. Digital video images are the largest of the data objects used within the system; averaging about 40,000 Bytes, and typically in a range from 20,000 to 80,000 Bytes. One of the smallest data objects represents the keystroke echo characters (typically several bytes in length) which provide visual feedback, on a user's viewing screen, that the user's keypad or keyboard entries, intended for an upstream data processing center, have been received by the intended processing center. Other data objects may contain audio transmissions, and/or the processing instructions intended for a user's premise equipment, such as instructions for the processing of overlay text, or graphics information for a particular presentation. The transfer and processing of overlays is best accomplished, typically, by means of static and dynamic image elements.

3) Script:

Scripts are data objects, typically of some hundreds to several thousand bytes in length, which are used to structure a presentation. By defining clock reference and timing sequences, they instruct presentation display equipment when and for how long video images and audio are synchronized, and when and for how long text or graphics are overlaid onto video images. Processing is very flexible and may occur at a centrally located server, or while en-route through distribution facilities, or at a remote terminal at the user site where graphics and text may be overlaid, or in some combination thereof 4) Presentation:

Presentations are composite data objects comprising those image elements and script as required to satisfy specific user requests. A particular presentation may include, for example, background music for a page of text and animated graphics plus a window within which motion video and accompanying audio describe an item. There is a script which details how the various elements are displayed and sequenced within a given time line.

5) Rendered Cache:

A rendered cache is a directory or set of directories disposed in an operations center presentation database that stores content previously generated or authored at remote locations. The content typically consists of "xML"—that is, Mark-up Languages used to author a page, and is the notation used to describe syntax and other features of a page. Note that a page may contain text, graphics, audio, video and links to other pages.

6) URL:

URL stands for Universal Resource Locator, an address or location of a page.

Presentation Data Encoding Technologies

Many data types can be included in presentations distributed by the methods and systems provided by the invention. These data types include video, audio, graphics, text, and command (e.g., script) data. Various methods of encoding such data can be used by the invention to maximize the number of users to which presentations can be distributed within a given channel. The MPEG standards provide a number of encoding techniques, some of which are described below.

The MPEG standards, in general, and MPEG-2, in particular, are not examples of "uniquely" defined standards. Instead, MPEG-1 and MPEG-2 are "generically" defined standards. The MPEG-1 and MPEG-2 specifications are structured in several parts: system, video, audio and private data. The MPEG-2 specification supports a number of different applications by means of various "profiles" and "levels."

A "profile" defines a number of technical features and functions, for example, signal-to-noise ratio and spatial relationships. Each profile offers a collection of compression tools that together make up the coding system. For each profile, a different set of compression tools is available. There are currently five Profiles in the MPEG-2 system. Each profile described below is progressively more sophisticated and adds additional compression tools to the previous profile. This means that each successively higher profile will do more than the last, but is likely to cost more to make, and thus cost more to the consumer. Another "cost" of complexity is in the time to process, or the real-time delay, introduced by the compression process.

The Profiles are as follows:

Simple Profiles have the fewest compression tools.

Main Profiles have all the compression tools of the Simple Profile plus one more (termed bi-directional prediction). Main Profile provides better (maximum) quality for the same bit rate than the Simple Profile, but costs more in terms of integrated circuit (IC) surface area. A Main Profile decoder will decode both Main and Simple Profile-encoded pictures. This backward-compatibility pattern applies to the succession of Profiles. A refinement of the Main Profile, sometimes unofficially known as the Main Profile Professional Level, allows line-sequential color difference signal sampling of the analog color subcarrier frequency (typically around 3.58 MHz) using a (4:2:2) sampling rate. However, the Main Profile does not provide the scaleable compression tools of the higher profiles.

Scaleable Profiles add compression tools that allow the coded video data to be partitioned into a base layer and one or more 'top-up' signals. The top-up signals can improve either the noise [signal to noise ratio (SNR) Scalability] or the resolution (Spatial Scalability). In Scaleable Profile systems, the lowest (base) layer can be coded in a more robust way, and thus provide a means to broadcast to a wider area, or provide a service for more difficult reception conditions. Nevertheless there will be a premium to be paid for use of Scaleable Profiles in terms of receiver complexity.

High Profiles include all the previous tools plus the ability to code line-simultaneous color-difference signals. In effect, the High Profile is a 'super-system', designed for the most sophisticated applications where the ultimate criterion is image quality, and where there is no constraint on bit rate.

The video inputs to the Simple and Main systems are typically in terms of YUV components; video inputs to the High system are more likely to be RGB (Red, Green, Blue) with the 8:8:8 sampling. The YUV components include a luminance component, Y, and two chrominance components, U and V. However, the first four profiles code the color difference signals line-sequentially. As described above the Main Profile uses a 4:2:2 sampling rate multiplier for the Y:U:V components, so the sampling rates for the three components are approximately, 13.5 MHz, 6.8 MHz, and 6.8 MHz.

A "level" is a set of constraints imposed on selected parameters within a particular profile, for example, picture resolution and delay. MPEG-2 allows four source formats, or 'Levels', to be coded, ranging from Limited Definition (about today's VCR quality), through Standard Definition and 16:9 Enhanced Definition TV (SDTV and EDTV), to full HDTV. Each level can be accomplished for a range of bit rates up to a maximum of 15 Mbps for MPEG-2. For example, to implement SDTV or EDTV, the Main Profile at Main Level (MP@ML) combination is used. For HDTV, more high-capacity coding is required, such as that represented by Main Profile at High Level (MP@HL). Levels are associated with the source format of the video signal, providing a range of potential qualities, from limited definition to high definition:

Low Level has an input format which is one quarter of the picture defined in the International Telecommunications Union ITU-R Recommendation BT. 601.

Main Level has a full ITU-R Recommendation BT. 601 input frame.

High-1440 Level has a High Definition format with 1440 samples/line.

High Level has a High Definition format with 1920 samples/line.

The H.261 standard, for example, is a "low delay" version of MPEG-2 that has been made suitable for 2-way video conferencing. The low delay characteristic is a consequence of the small amount of information required for H.261 two-way video conferencing which is designed for a 64 kilobits per second transmission rates on Integrated Service Data Network (ISDN) lines, but can approach T-1 line transmission rates using multiple rates of "n X 64" kbit/s, where n is a number from 1 to 30. The amount of information required for the H.261 standard transmission is small because of lower resolution requirements, smaller pel blocks, and more abrupt frame to frame transitions.

The representation of images and motion video in digital format is accomplished by looking at a picture as though it were made up of individually distinct elements (discretization), and then subdividing those elements into easily defined parcels (quantization). A given image or one of the series of images (frames) that define a motion video segment can be represented spatially as an array of picture elements—pixels or pels. Each pel, in turn, can be represented by a number of binary digits, or bits. For color elements, each pel can be represented by a combination of three primary color components: red, green and blue, or RGB. For eight (8) bits per color component, each pel can be represented by twenty-four (24) bits.

A single-frame image defined by a width of 640 pixels and a height of 480 pixels would thus require 7,372,800 binary digits, or 921,600 Bytes to render the image. A movie made up of 24 such images per second would require a transmission stream of 177 million bits per second. For NTSC Television, each frame is interlaced, or divided into 2 fields; one field defines the odd-numbered of the 525 horizontal scanning lines, and the second field defines the even-numbered scanning lines. This division conserves TV bandwidth at the cost of some visual quality. Note that progressively scanned frames require twice as much information as the NTSC interlaced frames, because the image rate is maintained at 60 frames per second. (Newer PC's are typically refreshed at 70, 80 or more repetitions per second).

Each NTSC-TV pel is typically represented by YUV components rather than RGB components because sub-sampling the chrominance components requires fewer bits (8) than sampling the RGB (24). A small loss in visual quality results from use of the YUV components.

The maximum vertical resolution promised by a particular TV system is greater than the actual observed resolution. The reduction in resolution is due to the possibility of a picture element (pixel) falling "in-between" the scanning lines (i.e., the Kell factor). Measurement gives an effective resolution of about 70% of the maximum resolution for progressively scanned (i.e. not interlaced) systems. If the image is interlaced, then the 70% factor only applies if the image is completely stationary. For non-stationary interlaced images the resolution falls to about 50%. With NTSC TV, vertical resolution is defined by the active portion of the 525 horizontal scanning lines, which after reduction from the Kell factor and Interlace factors, is approximately 338 horizontal lines.

The horizontal resolution is defined by the active picture period, the bandwidth and the aspect ratio at 332 lines per picture height. The number of "active" pels per frame is thus 112,216 (338×332); with 8 bits to define luminance and another 8 bits to define chrominance in terms of color difference signals, 1.8 million bits defines a frame. At 30 frames per second, the corresponding transmission rate is about 54 Megabits per second.

In both of the above examples, calculation was based upon direct analog-to-digital conversion with no regard to redundancy or compression. MPEG-2 can compress either the progressively scanned video used with personal computers, or the interlace-scanning used for television monitors. The four processing elements comprising MPEG-2 are: discrete cosine transformation (DCT), quantization, variable length coding, and motion estimation.

DCT transforms a block of pels into a block of frequency domain coefficients of the same frame dimension, i.e., full-frame, half-frame, or quarter-frame. Compression is achievable because the high frequency (i.e., rapidly changing) content is not readily perceived by human vision; therefore, the high frequency content can be discarded.

Following the DCT-process, the coefficient-values are quantized according to both the desired output quality and the characteristics of the specific video segment in the presentation. Quantization is the process of converting data from continuous values to a finite number of discrete values. The use of only a few quantizing levels provides inferior image quality, but fewer bits are needed. Using many quantization levels produces better image quality, but requires either a longer transmission time or wider bandwidth. In practical applications, the number of levels in a quantizer changes dynamically during the coding sequence according to both content and the need to maintain a constant bit rate. In constant bit rate coding, the number of transmitted bits per unit time is constant in the channel. Since the encoder output rate generally varies depending on the picture content, the encoder regulates the rate constant by buffering and other techniques.

Variable length coding is a lossless technique whereby the statistical properties of a given set of symbols, representative of compressed content, are used to assign shortest codes to the most frequently occurring symbols, and the longest codes to the least frequently occurring symbols. For MPEG-2, the committee settled on the Huffman Code for reasons of simplicity and efficiency.

Motion estimation is a real-time, predictive coding technique employed to minimize the redundancy from frame to frame of a motion video sequence. Motion is simulated by presenting a series of still frames to a viewer at a rate sufficient to allow the eye's visual persistence to smooth the differences between successive images such that the brain perceives continuous movement.

MPEG-2 defines three types of frames to provide groupings for compression. Each type of MPEG-frame can be either a television "frame" or, with interlaced scanning, a television "field"—i.e., two fields per frame. The first type of MPEG-frame is the I-FRAME (I for "intra"). The I-FRAMES become the reference building blocks for the other frame types.

The second type of MPEG-frame is the P-FRAME (P for forward predicted). P-frames are created by means of motion vectors and error blocks that allow reconstruction from a reference frame, that may be either a previous I-frame or P-frame in the video stream.

The third type of MPEG-frame is the B-FRAME (B for bi-directional predicted). B-frames are coded like P-frames except that the reference can be to a previous frame, a subsequent frame, or both.

A set of frames made up of an I-frame followed by some number of P-frames and (with-or-without) B-frames is called a Group Of Pictures (GOP). The number of frames in a GOP is flexible, but selected in order to minimize perceptible errors. (For interlaced scanning, when video-fields are used instead of video-frames, the GOP comprises frame-aligned pairs that can occur as only I-I, I-P, P-P and B-B). Typically, a 16-by-16 block of pixels within the frame in question is compared with blocks in a previously coded frame. The best-matched block is used as the prediction. With perfect match, no bits are transmitted. Differences are coded by means of DCT, quantization, and variable length coding. Simultaneously, the location of the matched block is also coded via variable length coding.

Within MPEG-2, motion estimation can be done on either a frame basis or field basis, or a combination of the two. These alternatives are useful because fields provide more accuracy in predicting rapid movement as in fast-action motion pictures, while frames are better for stationary scenes and images as in still frames of graphics and text as may be used, for example, with program guides or interactive shopping.

Typical MPEG-2 compression scales the digital representation of analog video by a factor between 10 to 50, depending upon specific content. However, scaling factors approaching 200 have been achieved. Fundamentally different approaches including object-oriented segmentation, model-based coding, and fractal coding can provide scaling factors greater than 200.

When DCT is used to digitize very high resolution images, certain visual artifacts become increasingly distracting. The primary offender is an artifact known as "block effect." These artifacts are a direct result of the discarding, through the use of DCT, of the higher frequency components of the images. The situation is most noticeable for the transmission of high resolution still frame images over communication paths, when the communication paths are utilized close to their capacity ("capacity challenged") and the introduction of transmission delay is not an option when resolution loss occurs, i.e., because of multimedia data object synchronization requirements. One example of a "capacity challenged" path is a 36 megabits per second (Mbps) path that is simultaneously transmitting twelve 3 Mbps presentations. If during any of the twelve presentations, a higher data rate segment of a presentation requires greater bandwidth, i.e., 6 Mbps for a demanding commercial segment, the communication path will be unable to provide the 6 Mbps of bandwidth and the higher data rate segment will be provided with lower resolution images using only 3 Mbps of the path's bandwidth.

For such capacity challenged communication paths, and for Internet applications, MPEG-4 proposals are under consideration. The proposed MPEG-4 wavelet-based profile departs from the DCT texture coding of MPEG-2 in favor of a scheme that uses scalable granularity to separate image data into several layers for transmission. For example, the MPEG-4 approximation can emphasize the foreground of an image where the important motion occurs, i.e., in a basketball game sequence. Such foreground emphasis ca reduce the bandwidth required for transmission of the basketball game presentation data from about 8 Mbps to about 4 Mbps. In other circumstances, where the background layer resolution needs to be higher, the MPEG-4 profile can trade off more time, or higher path throughput in order to accomplish the higher background layer resolution.

The coding efficiency (i.e., high compression performance) of MPEG-4 serves to obviate the visual artifacts associated with DCT-based systems. MPEG-4 data compression and means for generating artificial multimedia environments are based on software design toolkits including authoring tools such as enhanced versions of Hyper Text Markup Language (HTML). The artificial multimedia elements, include images that are based on digital objects, such as the dancing baby shown in some early episodes of the FOX TV network show "Ally McBeal".

MPEG-2 profiles provide a capability for audio encoding and compression. The MPEG-2 profiles define low bit-rate coding for multi-channel audio. For example, channels can be dedicated to left, right, center, two rear surround, and low-frequency enhancement. Normally, only a portion of a channel is required for the low-frequency enhancement audio. Additionally, several multi-lingual or commentary channels can be provided.

Conversely, one or more of the channels can be dedicated to special purpose data streams used for sending information to video and/or audio to processor(s). As an example, bit-maps of graphics and text can be transmitted for local visual overlay on an image presentation. Overlays can also be sent as MPEG P-frames with reference to the frame to be overlaid. Display of overlay images, such as pricing and availability information, can be triggered by user action at the set-top box or local processor.

The MPEG-2 profiles also contain a systems section that specifies how to multiplex compressed video and audio into a compressed information, bit stream. The systems section supports synchronization and interleaving of multiple compressed streams, buffer initialization and management, and time identification. Program streams and transport streams are specified in the systems section of the MPEG-2 profiles. Each program stream comprises long, non-fixed length packets. Each transport stream uses a fixed-length, 188-byte packet much more suitable for error-prone environments such as satellite and cabled, consumer networks. The packets consist of a 184-byte payload and a 4-byte (32 bit) header.

The header contains information corresponding to:
1. Synchronization (8 bits) to find the packet start;
2. Error Indication (1 bit) to indicate that errors are probable;
3. Payload Start Indicator (1 bit);
4. Priority Indicator (1 bit) to indicate more important data than within packets not so indicated, and which could be discarded if network traffic congestion so dictates;
5. Packet Identifier, or PID (13 bits), to label data packets from within the same elementary stream defining a given image presentation;
6. Scrambling Control (2 bits) to identify operator-specific handling;
7. Packet Contents (2 bits) to indicate whether payload is image element specific, or an adaptation header to supplementary control information; and,
8. Continuity Counter (4 bits) to assist the data receiver/processor in identifying dropped or duplicated packets.

Interactive Distribution of Selectable Presentations (InDiSPensible)

According to the method for interactive distribution of selectable presentations (InDiSPensible), a presentation comprising an image, or series of images, is assembled along with a destination address in response to a user request. Assembling of the presentation is typically performed by processing resources at the central location of the InDiSPensible system. Each image in the presentation is uniquely identified to correspond to the requesting user and a transmission path along which the data object corresponding to the presentation is routed. In the case of motion video, each data object (or presentation) comprises a sequence of images, each image is uniquely ordered and addressed for receipt by the requesting user. This is true whether the user has requested a single, still-frame image or an entire movie.

The images, or multimedia presentations, can be delivered as analog or digital streams of packets. The presentations can be organized at the central location server, at a system node in the transmission path, at the remote-terminal, or within the user display device into a format suitable for display to a user. Display can be accomplished, for example, through an addressable decoder (as may be associated with any analog or digital set-top box) coupled to an analog TV set. Alternatively, a digital display device (a PC or digital TV set) can be used without a decoder. When used, digital set-tops are typically configured with a "thin client," and "open cable" set-tops anticipate a "fat client" to enable the processing and formatting of images for display on an analog TV set. Digital Subscriber Line services from telephone companies, and high-capacity cable modems in a CATV plant can also have processing resources for delivery of requested image presentations to users.

The invention can be used for server navigation, interactive multimedia-on-demand, interactive video-on-demand, and web-browsing to the TV set.

The selected presentation can include a script that comprises timed-sequential combinations of still-frame and/or motion video sequences, along with audio commentary and/or background music. The presentation can also be overlaid with graphics or text. Delivery to the user of the presentation can occur within an over-the-air or cabled broadcast stream. More particularly, the invention relates to systems where video, audio and other information are encoded, stored and processed in a digital format.

This type of interactive multimedia presentation communications system is well suited, but not limited, to providing the functions and capabilities required of an interactive shopping mall. In this context, a system user generally observes video images and can hear audio commentary and/or background music appropriate to the display. The invention applies equally to narrowband and broadband media implementation. However, the enhancements attendant to the use of broadband lead to the preferred embodiment discussed in detail herein. The invention thus includes a broadband equivalent of services presently provided on the Internet via narrowband distribution media such as twisted-pair wiring and cellular wireless services.

The invention is directed to systems where subscribers select from a plurality of video, audio, image, and/or data presentations for viewing on subscriber television sets and/or personal computers. The presentations are transmitted in the form of digital packets, e.g., an MPEG-formatted packet, to addressable processing equipment (APE) located within a distribution network. Typically, the APE receiving the presentation packets comprise a plurality of set-top boxes for a number of simultaneous users, where the set-top boxes are located at the user premises. Each of the digitized packets is uniquely addressed to a requesting subscriber.

APE that serves a personal computer (PC) typically operates with an output frame repetition rate of 75 progressively scanned frames per second. APE that serves an analog television operates at a delivery rate determined by the NTSC frame repetition rate (i.e., 30 frames per second). In a digital format, television approximating "VCR-quality" requires an input MPEG-2 rate of about 3 Megabits per second.

For images in MPEG-2 format used in the digital equivalent of a still frame mode, a worst case for MPEG coding efficiencies occurs because no "motion" is used, and all serial images are non-contiguous. Compression efficiency is reduced by a factor of at least 2, and perhaps as much as 4, as a result of the absence of B-frames for prediction. An intermixing, within the MPEG transport stream, of limited duration motion together with still frames enhances the viewer experience, and increases the compression efficiency of the agglomeration of simultaneous, interactive video presentations. One example of intermixing is a program guide providing a page having text and graphics as well as an inserted window of motion video, e.g., a program preview. Another intermixing example is a sales catalog with descriptive video to display appliances or clothing.

The invention also provides a means to account for the absence of any timing information to synchronize the independently stored audio, video and overlay information within their respective databases. The pre-mastering and multiplex processing techniques are also a part of the present invention.

The pre-mastering process encodes and stores video segments, audio segments, overlay text and or graphics with packet headers, but without addresses because the destination of segments is unknown until requested by the user. When a particular presentation is requested by a user, the multiplexing process adds clock reference timing, along with time stamps for the segments which make up the presentation. Wrap-around packaging is added to synchronize the segments and identify where in the transport stream the associated segments are to be found.

Interactive Distribution of Selectable Presentations (InDiSPensible) System

The invention is generally directed to a communications system that can be described as an interactive distribution of selectable presentations (InDiSPensible) system. The presentations are typically multimedia presentations including one or more multimedia elements. Each of the multimedia presentations generally includes a sequence of video images, accompanying audio, text and graphics, and a viewing script or menu of choices related to the presentation that can be provided as a graphics overlay.

The system is accessible to a plurality of simultaneous users. Each user can select a particular multimedia presentation, for viewing on the user's television set or personal computer monitor, from a plurality of such presentations available to the system. In response to viewing all or part of a presentation, the user can select from among the available options. The options can include another presentation that is either related to, or not related to, the immediately prior presentation.

The InDiSPensible system includes one or more presentation preparation systems (otherwise referred to herein as a server complex), input and output devices, one or more signal processors, and a bi-directional communications complex network. One example of the InDiSPensible system 100 is shown in FIG. 1.

Each of the presentation preparation systems has processing resources adapted to process and transmit digital data corresponding to presentations. The digital data transmitted by the presentation preparation system processing resources includes encoded digital data streams. The presentation preparation system also has processing resources adapted to respond to a user input by performing transactions related to the presentations. The processing performed by the presentation preparation system occurs after assembly of presentation data and includes real-time responses to user requests.

Each of the user input and output devices is adapted to communicate with the presentation preparation systems. Each presentation preparation system is adapted to receive inputs from simultaneous users. Each of the simultaneous users corresponds to one of the input and output devices. The inputs include requests of selected presentations. The selected presentations include multimedia elements.

The signal processors have network destination addresses and are adapted to receive and process the encoded digital data streams. The inputs and the encoded digital data streams include the signal processor network destination addresses.

The processing of the encoded digital data streams performed by the signal processors includes converting the encoded digital data corresponding to the selected presentations into converted digital data having formats suitable for processing at addressable equipment for viewing on user display devices. The addressable signal processors can be located anywhere in the bi-directional communications complex network, but are typically located within the set-top boxes at the user locations. The display devices include television sets and personal computer monitors disposed at customer premises. The user-selected presentation is thus available to the user that selected it.

Note that for some embodiments, each successive selection by a user is an independent communications sequence with a remote repository of information. A subsequent selection, therefore, does NOT rely upon a previous download to customer-premise-located equipment of a database with which a user then interacts.

The bi-directional communications complex network is adapted to connect the signal processors (e.g., the user APE 155 as shown in FIG. 1) to the presentation preparation system for the passing of information from one to the other.

The InDiSPensible system 100 can include signal transmitters and signal receivers. The signal transmitters are adapted to transmit encoded digital data received from the presentation preparation systems to the signal receivers. The signal transmitters and the presentation preparation systems can be disposed at operations centers (such as local operations centers 120 as shown in FIG. 3).

The signal receivers are disposed at local distribution platforms. The local distribution platforms are disposed in the bi-directional communications complex network. The signal receivers are adapted to receive user identifications and requests from the input and output devices.

The presentation preparation systems can be adapted to prepare and store the digital data corresponding to the presentations. The preparing typically includes assembling the presentation and activities occurring prior to the assembling. The prior activities can include adding address and timing information. The signal processors can be adapted to receive user identifications and requests from the input and output devices.

The user inputs from the simultaneous users can include user inputs provided after user viewing of a portion of the first presentation. The multimedia elements can include a list of options. The options can be adapted for user selection. The list of options can include at least one option for performing at least one transaction related to the selected presentation. On the other hand, the list of options can also include at least one option for requesting a second presentation for viewing on at least one of the display devices.

The multimedia elements can include one or more of still frame video images, motion video images, audio, overlay graphics and text accompanying the still frame video images; and a list of options related to the selected presentations. As before, the options can be adapted for user selection.

The encoded digital data can be formatted according to MPEG techniques.

The presentation preparation systems processing resources can be adapted to retrieve information from one or more of third party service providers and third party information providers. The information retrieved from the one or more third party service providers can be adapted for overlay on the selected presentation. The information retrieved from the one or more third party service providers can also be adapted to replace one or more of the selected presentations.

The multimedia elements can include one or more of still frame video images and motion video images. The multimedia elements can be formatted as encoded digital data objects. Multimedia elements corresponding to each of the selected presentations can be transmitted as an encoded presentation data stream. InDiSPensible system 100 can be adapted to use a single program clock reference for a user of the encoded presentation data stream.

The remote clients can be disposed at premises of the simultaneous users (i.e., customer premises 150. Each of the remote clients can be adapted to receive inputs from a user including a request for a first presentation, and forward the first presentation request to the presentation preparation systems. The first presentation request can include a destination address corresponding to the remote client.

The multimedia elements can include one or more of video data objects and audio data objects. The video data objects can include data corresponding to one or more of still-frame video images, and motion video images. The audio data objects and the video data objects can be encoded with timing information prior to the processing by the signal processors.

The presentation preparation systems processing resources can be adapted to assemble encoded data streams corresponding to the first presentation. The destination address and the timing information can be inserted into appropriate headers attached to the encoded data streams during the assembling. The presentation preparation systems processing resources can also be adapted to transmit the encoded digital data streams to the signal processors.

As stated before, the remote clients can be disposed at customer premises 150. Each of the remote clients can be adapted to transmit the user input to the presentation preparation systems. The bi-directional communications network complex can include local distribution networks connecting the remote clients to the presentation preparation systems. The presentation preparation systems can include a local operations center 120 connected to the remote client by at least one of the local distribution networks.

The local operations center 120 can be adapted to respond to a maximum number of simultaneous active users by processing and transmitting presentations selected by the simultaneous active users. If the number of users simultaneously transmitting requests of selected presentations exceeds the maximum number of simultaneous active users, the local operations center can be adapted to respond by transmitting over the local distribution networks encoded data streams from the local operations center 120 to remote clients for a first number of users. The first number of users has a value no greater than the maximum number of simultaneous active users. The number of active users can include the first number of users, and a remaining number of users, i.e., the number of simultaneously requesting users beyond the maximum capacity of the LOC 120. The LOC 120 can be adapted to respond to the number of users simultaneously transmitting requests of selected presentations exceeding the maximum number of simultaneous active users by transmitting common multimedia presentations to the remaining number of users.

The multimedia elements can include still-frame video images and motion video images. The presentation preparation systems processing resources can be adapted to prioritize the processing and transmitting of the motion video images and the still frame images using software algorithms based upon MPEG-encoding techniques and network traffic statistics. The presentation preparation systems processing resources can also be adapted to transmit the encoded digital data stream at transmission bit rates up to a maximum transmission bit rate. The prioritizing can be adapted to prevent exceeding the maximum transmission bit rate.

The InDiSPensible system 100 can include remote clients having destination addresses. Typically, the remote clients comprise addressable processing equipment 155. The remote clients can be adapted to receive the inputs from the input devices, and transmit requests and data corresponding to the inputs to the presentation preparation systems. The remote clients can also be adapted to receive the converted digital data from the signal processors, and transmit the converted digital data to the display devices. Each of the presentation preparation systems can include a corresponding presentation server (such as the AVTS 350 shown in FIG. 3) adapted to transmit a server identification signal to each of the remote clients. The remote clients can be adapted to detect and store the server identification signal, and store a server identification included in the server identification signal, and add the server identification signal to messages transmitted from the remote clients to the corresponding presentation server. The inputs can include transmission paths and the destination addresses corresponding to the remote clients. The presentation preparation systems can be adapted to respond to input from a first remote client by calculating a user number corresponding to a first remote client destination address. The first remote client and the presentation preparation systems can be adapted to calculate encoded data packet identifiers for the selected presentation based on the user number.

The signal processors can be disposed in remote clients. The remote clients can be disposed at customer premises 150 locations. The remote clients can be adapted to receive inputs from corresponding users, and receive communications and presentations. The remote clients can also be adapted to forward the communications and the presentations to user display equipment, and to forward the inputs from the corresponding users to the presentation preparation systems.

The signal processors can be disposed in addressable processing equipment having destination addresses. The bi-directional communications complex network can be adapted to transmit signals having destination addresses corresponding to the addressable processing equipment. Each addressable processing equipment can be adapted to selectively retrieve signals having the corresponding destination address transmitted from the bi-directional communications complex network.

The presentation preparation system can includes a system controller 330 adapted to determine the location of the multimedia elements. The presentation preparation system can also include a rendered cache. The system controller can includes a browser. In response to one of the user inputs requesting data corresponding to a URL, the browser is adapted to retrieve pages previously prepared and stored from the rendered cache, and retrieve from an Internet one or more pages corresponding to the URL.

Distribution Hierarchy

The technical architecture implementing the invention can include server platforms operating with either proprietary or open systems access method protocols. The application of the invention is not limited to the exemplary systems described herein.

The Interactive Distribution of Selectable Presentations (InDiSPensible) system 100 comprises several interrelated functional elements. In some embodiments, the InDiSPensible system 100 elements are arranged in a distribution hierarchy as shown in FIG. 1. For the embodiments depicted by FIG. 1, all presentation data that is available from the InDiSPensible system 100 is stored at a national operations center (NOC) 105.

Figure 5A:
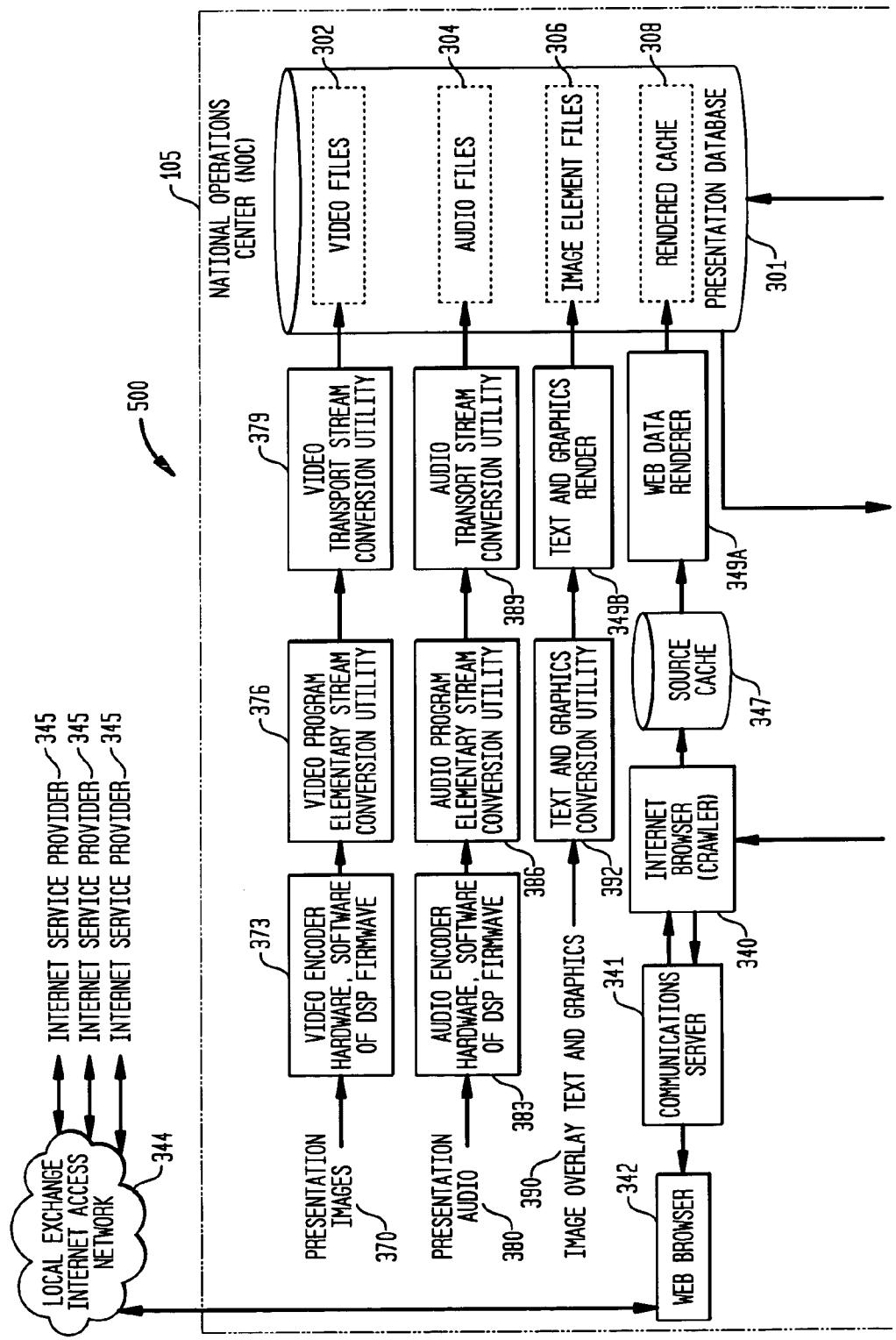
FIG. 5 illustrates variations at the server complex as needed for the level of service provided by the national operations center and the differing communications and data flow requirements in a national operations center.
Figure 5B:
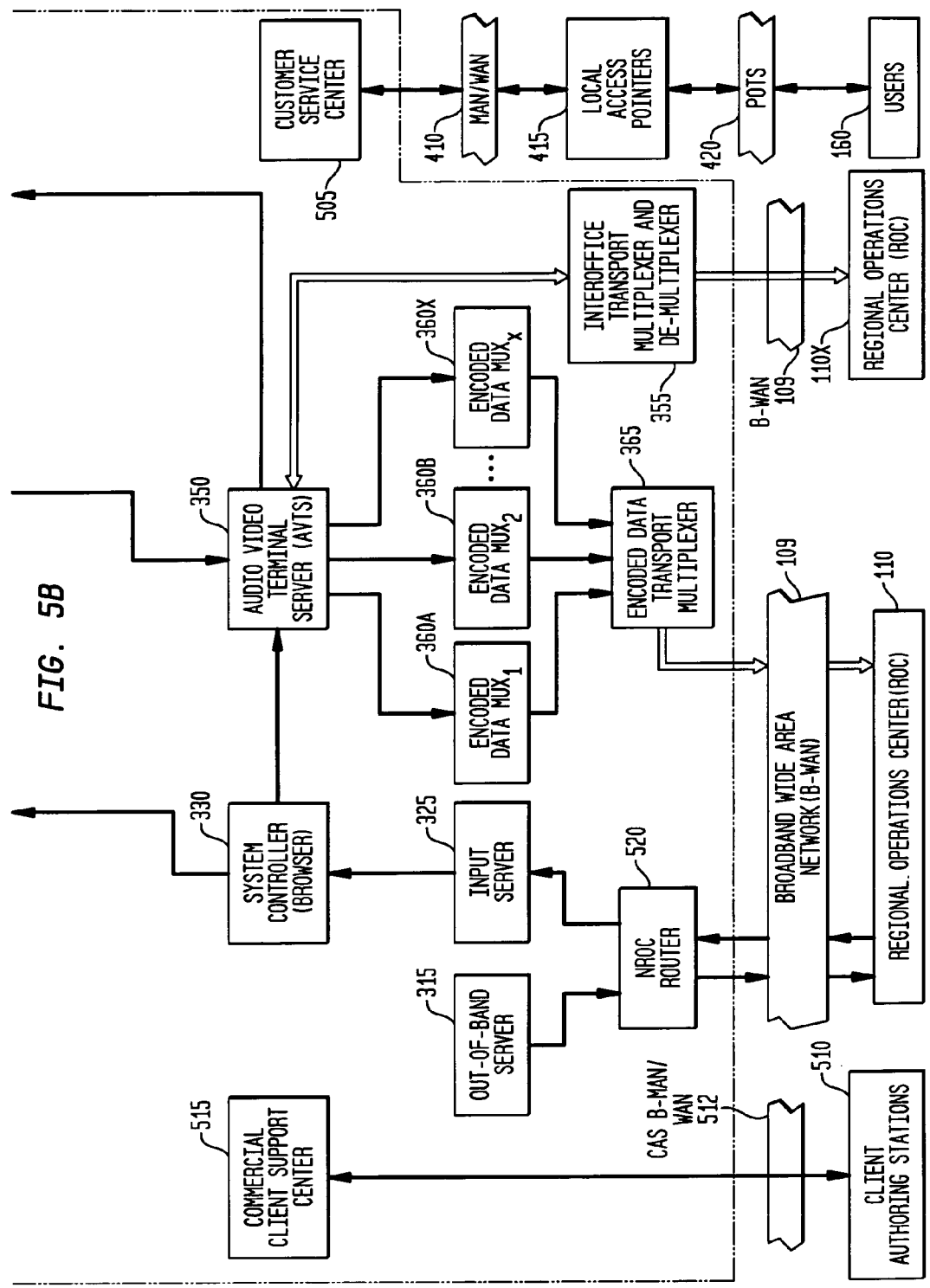

The presentation data stored at different local operating centers (LOCs) 120 and different regional operating centers (ROCs) 110 can differ because of differences in the information most utilized by users within areas serviced by these sub-centers. The availability of all presentation data at a super-center provides not only a backup source of information to users, but also a single point of contact for any information provider in their preparation of presentation data to be made available to users of the system herein described. Several NOC 105 components, according to some embodiments of the InDiSPensible system 100, are shown in FIG. 5.

Figure 4A:
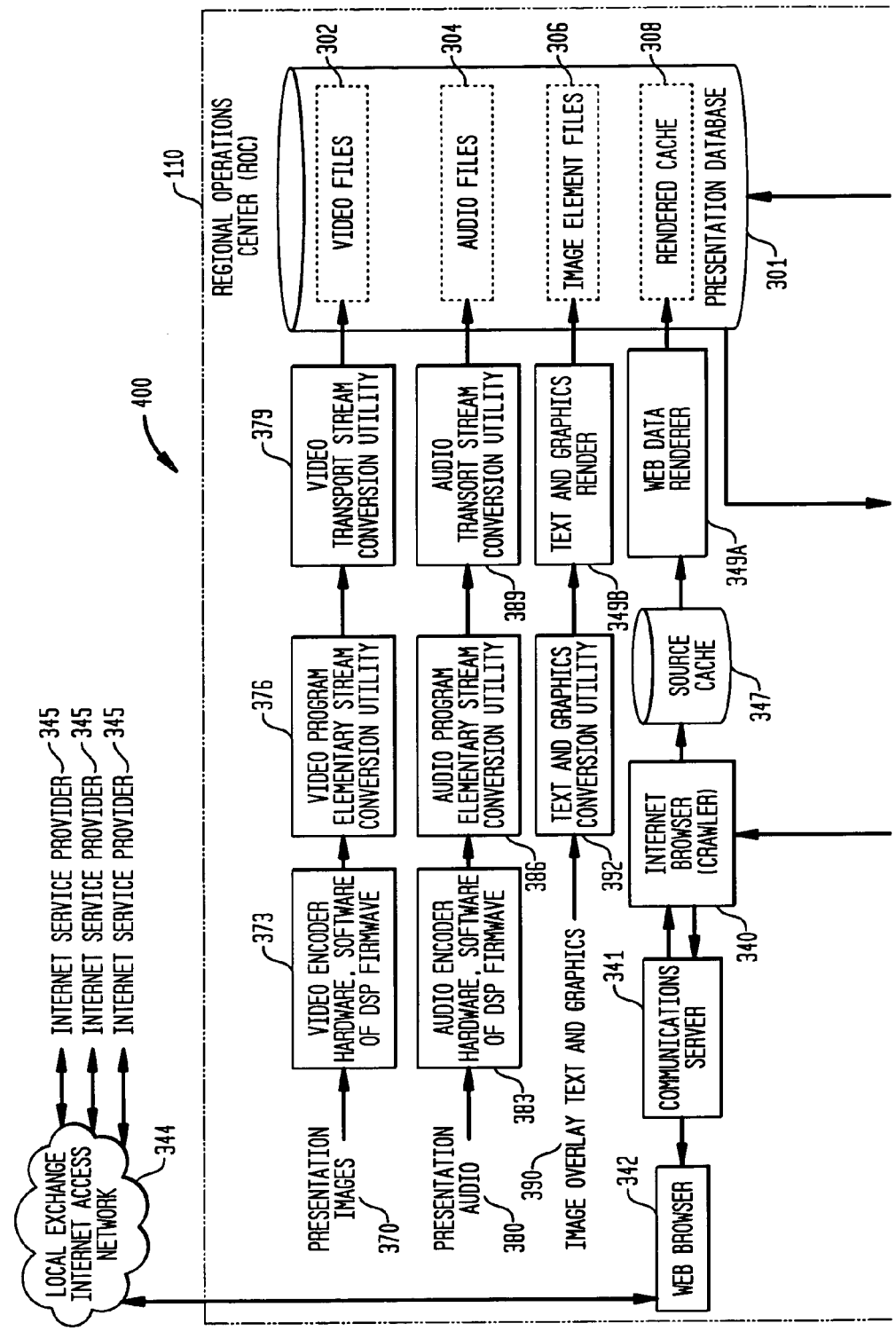
FIG. 4 illustrates variations of the server complex as needed for the level of service provided by a regional operations center along with an indication of the communications and the data flow in a regional operations center.
Figure 4B:
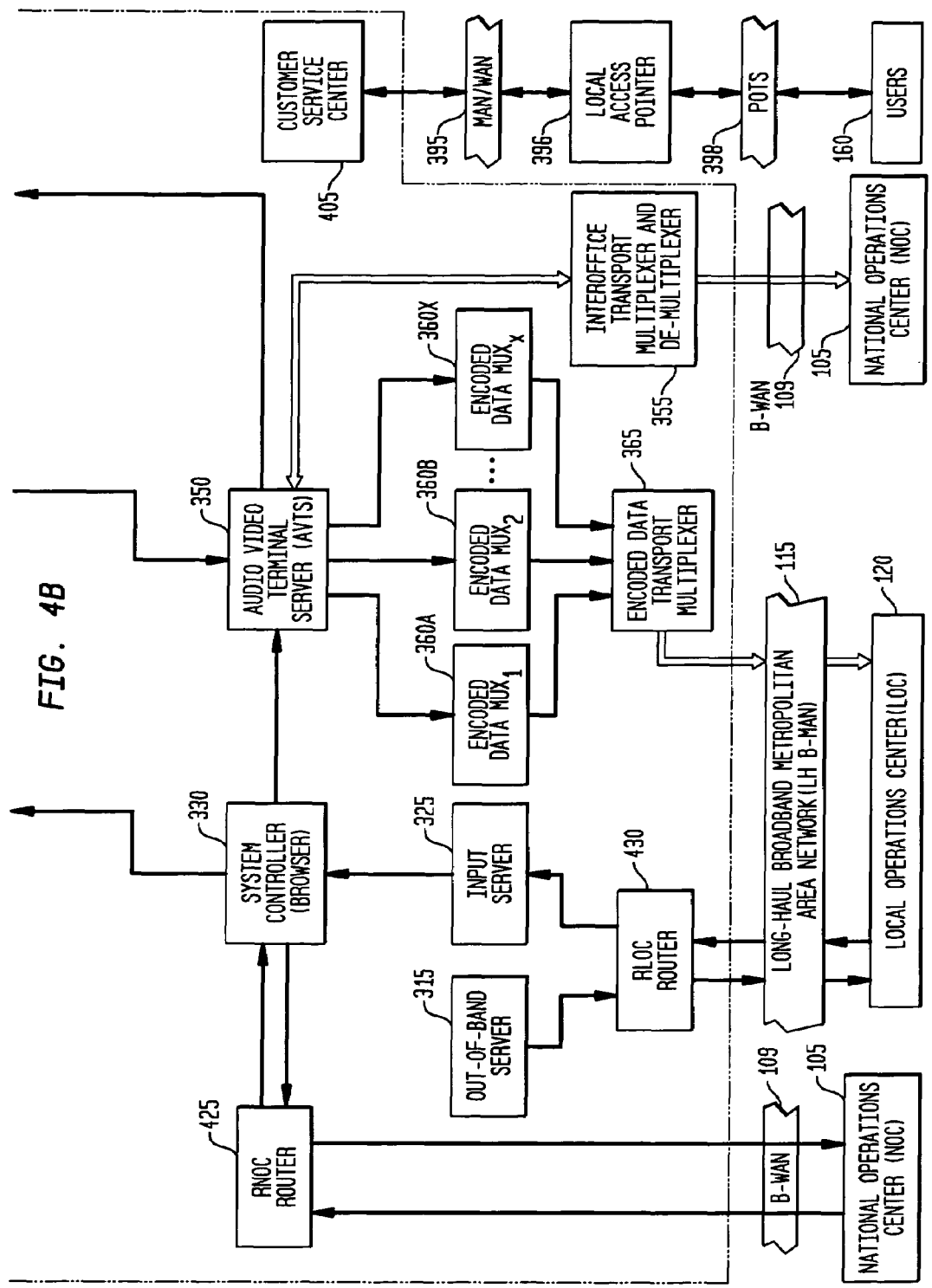

The NOC 105 can be connected to a number of regional operating centers (ROC) 110A through 110X by broadband digital wide area networks (B-WANs) 109 that are typically provided by a long-distance carrier, such as MCI WorldCom, AT&T, or Sprint. Several ROC 110 components, according to some embodiments of the InDiSPensible system 100, are shown in FIG. 4.

Commercial clients 107 can prepare or package information and services to be made available to users 160 of the InDiSPensible System. The commercial clients 107 can provide presentation data and subsequent modifications and updates such as price and availability information through the NOC 105 as a single point of contact. Using the NOC 105 as a single point of contact ensures that the updates are uniformly available throughout the InDiSPensible system 100 operating and service areas.

The commercial clients 107 typically prepare their presentations on client authoring stations 510. The client authoring stations 510 can provide information over a wide area- or metropolitan-area network 512 to a support center 515 established at the NOC 105 for that purpose. Personnel at the NOC 105 are responsible for the physical updates to the appropriate database. Presentations originating from Internet Service Providers 345 can either be retrieved on-line upon user 160 request or prepared ahead of a request for access as business partners may agree.

Each ROC 110 can serve a large metropolitan area with a plurality of local operations centers (LOCs) 120A through 120X. The ROCs 110 can be connected to the LOCs 120 via long-haul broadband metropolitan area networks (LH B-MANs) 115. The LH B-MANs 115 can be provided by long distance carriers. However, depending upon distance, area code service boundaries and franchise service area requirements, a short-haul broadband metropolitan area network (SH B-MAN) may be in order, in which case the facility can be available from CATV operators, local exchange carriers (LECs), or regional bell operating companies (RBOCs).

Several LOC 120 components, according to some embodiments of the InDiSPensible system 100, are shown in FIG. 3. The primary purpose of a LOC 120 is to provide a site wherein the server complex is housed. Depending upon the business relationship between the provider of the InDiSPensible system and the local distributors, that server complex can be installed at the primary distribution center (central office or head-end) of the local distributor, or remotely within an InDiSPensible system operators LOC 120.

As an example, a given Regional Operations Center (ROC) 110 may have service contracts with several local distributors within a given metropolitan area. Therefore, the ROC 110 may service a LOC 120 wholly dedicated to a certain local distributor, and simultaneously service a second and perhaps a third independently located LOC 120 used by one or more other local distributors.

When co-located, the server complex is connected to the local distributor's head-end 135 equipment by means of a broadband local area network. When located independently, the server complex within a Local Operations Center 120 is connected to a local distributor head-end 135 via a short haul broadband digital metropolitan network (SH B-MAN) 125.

A local distributor 130 typically operates a master head-end 135 that serves as a primary distribution hub for that local distributor. The master head-end 135 includes equipment to transmit and receive data to and from users' addressable processing equipment 155. The communications equipment is identified on FIG. 2 as a modulator 210 and a demodulator 220. Co-located within the head-end 135 are analog and/or digital channel modulators 260A to 260X and quadrature amplitude channel modulators (QAM) 250A to 250X. All broadband information transmitted to the users passes through a combining network 270, after which an optical or RF transmitter passes the information typically to a two-way trunking and distribution network. Both QAM and channel modulators are allocated 6 MHz per unit up to the maximum bandwidth allocated by the distributor to downstream communications.

Currently, broadband local distribution systems can allocate about 40 MHz to upstream (from the user) communications and 400 MHz to 800 MHz or so to downstream (to the users) communications. These allocations are referred to as sub-split. Other configurations, mid-split and high-split, allocate increasingly larger bandwidths to the upstream communications. However, because upstream communications are made up of relatively few bytes and slow transmission rates when compared with the multi-megabyte, high speed requirements of the presentations, the sub-split configurations are adequate unless there are significant bi-directional transfers of large images (or other composite data objects) in which case a mid-split, high-split, LAN, MAN or WAN may prove more suitable.

The local distributors 130 can include a two-way trunking network 140, a number of "slave" head-ends or distribution hubs 145A through 145X, and a two-way distribution network 148. The trunking network 140 typically comprises a relatively high-throughput fiber optic transmission media that connects the H/Es 135 to the distribution hubs 145. Two-way distribution networks 148 typically comprise somewhat lower throughput optical or coaxial cable, conditioned twisted-pair, or hybrid transmission media that connect the hubs 145 to the customer premises 150.

The connection of the local distributors 130 to the customer premises 150 can be accomplished through addressable processing equipment (APE) 155A through 155X when the APE is located at the customer premises 150, as shown in FIG. 1; or when the APE is located between the distribution hub 145 and the customer premises. Note however that the addressable functionality can be disposed at any hub or transmission line location where active electronics is installed between the H/E 135 and the display device. The display device can be a television set 165, a personal computer 175, or another image display device capable of displaying or recording presentation data provided by the local distributor 130.

The local distributors 130 can provide a number of local access points within their network. These access points enable users 160 to initiate requests for service from a customer (user) premises 150. In a case where a local distributor 130 maintains only one-way trunking and distribution to users, a local access point could be a telephone modem at the head-end 135 to which user APE 155 forwards requests via a telephone connection. Another example of a local access point could be any hub, within two-way trunking and/or distribution, where a distributor has installed an antenna to receive cellular transmissions from user APE 155. User requests thus received are forwarded to the head-end 135 from which they are routed to the appropriate InDiSPensible System server complex.

Users 160 input requests from a user remote 170 keypad or a personal computer input device 180, such as a keyboard, touch-screen or wireless device located at the customer premises 150. The user 160 request is forwarded from the input device to a remote client (i.e., a set-top box, a personal computer or other addressable processing equipment 155) located at the customer premises.

The remote client is adapted to transmit and receive data from the local distributor 130, or from APE 155 disposed within trunking 140, hub 145 or distribution 135 facilities between the local distributor 130 and the customer premises 150. In some embodiments, the remote client, a personal computer for example, includes APE 155, an addressable plug-in modem for example, and is referred to as APE hereinafter when such is the case. In any case, the remote client, or APE 155 forwards the user 160 request to the local distributor 130.

Head-End System

FIG. 2 shows the components of the H/E 135 for one embodiment of the invention. The H/E data flow 200 is also illustrated in FIG. 2. The SH B-MAN 125 connects the H/E 135 to the LOC 120. The H/E 135 includes a data communications router 205, an APE communications modulator 210, an APE communications de-modulator 220, an encoded data transport de-multiplexer 225, Quadrature Amplitude Modulators (QAM) 250A through 250X, analog/digital (A/D) channel modulators 260A through 260X, and combining networks 270.

The head-end 135 is a primary hub serving via some number of trunking networks 140 a like number of distribution hubs 145. The distribution hubs 145 serve a number of distribution networks 148. Each of the distribution networks 148 comprise cluster-hubs which serve a number of households. There are typically 48 to 2000 households in such a cluster according to the network design elected by the local distributor 130. Any of these hub-types can be selected as a consolidation or multiplexing point for the user upstream information streams as emanating from user APE 155.

The active and passive electronic equipment identified on FIG. 2, is available from many suppliers such as General Instrument Corp., Scientific Atlanta and others. Specialized routers and data communications equipment is available from these suppliers plus communications vendors such as Cisco, Lucent and others.

A typical "handshaking" transaction may proceed as follows:

With reference to FIG. 2, a user tunes a remote client (i.e., addressable processing equipment 155) to a channel frequency identified by the local distributor 130 as available for access to the InDiSPensible system presentations. This channel will be served by one of the xQAM Modulators 250A to 250X. Upon tuning to the channel frequency, the APE 155 receives a (frame gate) signal which originates at an out-of-band server 315 (See FIG. 3) at the server complex to which this user had been assigned by the local distributor 130.

The receipt by the APE 155 of the frame-gate signal triggers a response from the APE 155 to the server complex. This response takes the form of a message including an echo of the frame gate signal, the destination address of the APE 155, and an indication of the network path from the server complex to the APE 155. The message proceeds through the upstream distribution network 148 to a communications demodulator 220 at the local distributor 130 head-end 135. From there, the upstream message continues through a communications router 205 to a local operations center (LOC) 120 via either a broadband LAN or a short-haul, broadband MAN 125. At the LOC 120, the message proceeds through a communications router 320 to an input server 325 to a system controller 330. The system controller typically includes a browser.

The receipt of this message triggers a response to the APE 155 comprising a User Number assignment (related to the then current number of users simultaneously being served from the server complex), and an "Opening Navigation Menu" identifying the options available to the user. Both the Server (Presentation System) and the Client (APE 155) employ a common algorithm which requires the User Number for calculation in establishing a private communications sequence. Each communication link from server complex to a user is thus unique to a given user, and privacy and security are established as an integral component of the InDiSPensible System.

Upstream signals from the APE 155 are typically inputs provided by the user 160 as requests for presentation data. The APE communications de-modulator 220 forwards the demodulated input data to the data communications router 205. The data communications router 205 then forwards the demodulated data to the LOC 120 via the SH B-MAN 125.

Presentation data is transmitted from the LOC 120 as an agglomeration of MPEG data streams in a format consistent with the bandwidth of the SH B-MAN 125 to the encoded data transport demultiplexer 225 at the head-end site 135. The transport demultiplexer 225 forwards the encoded data stream to one or more of the QAM modulators 250A to 250X.

Content channels from sources other than the LOC 120 provide streams of data to the H/E 135 independently of the LOC 120. Content typical for these channels can include off-air VHF and UHF channels, satellite feed channels, local origination channels, subscription channels and leased channels. The data from these other content channels is received and modulated by the channel modulators 260A to 260X. The channel modulators 260 can deliver this non InDiSPesnsible-related content in either analog or digital format. In the case of a broadcast (wireless) operator, a digital vestigal side band (VSB) modulator is used in lieu of the QAM modulators 250.

The modulated InDiSPensible System presentation data stream outputs from the QAM modulators 250 are forwarded to the combining networks 270 at which point they are joined with the outputs from other channel modulators 260A to 260X and from the communications modulator 210 for transmission to user APE 155. The combining networks 270 typically implement passive techniques for assembling all of the downstream channels distributed from the head-end 130. For example, downstream 6 MHz channels can distribute some combination of analog video, 27 Mbps, 37 Mbps, and 1.5 Mbps (or less) data into a downstream transmission bandwidth of 750 MHz or more.

The combining networks 270 output is transmitted to the user premises 150 via the two-way local distributor network 148. Addressable content will pass the input port of the APE 155 via the two-way local distributor network 148. With the APE 155 tuned to the proper channel frequency and with the occurrence of an address match, the InDiSPensible System content is processed and forwarded to user display equipment such as a TV set or personal computer display.

The server complex forwards the requested information to Addressable Processing Equipment (APE) 155 "clients" unique to the requesting users. All communications between information sources and APE 155 proceed through carrier facilities. The communications are normally independent of Information (or Internet) Service Providers for presentations which indicate that Internet-sourced presentations are available. The requests from a user for such presentations proceed to a server complex from which transactions to Internet providers are initiated. The results of such requests are formatted at the server complex for the user display format and transmitted as usual from the server complex to the addressable client at the user premises for display to the requestor.

Operations Centers

The servers, databases, caches, multiplexers, transceivers and other devices included in presentation preparation systems according to some embodiments of the invention can be independently operated within environments that are centralized or distributed. The communications facilities that link users with servers can be owned and maintained by a variety of owners and operators. None of these variables limits the practice of the invention.

FIG. 3 illustrates the components of a Local Operations Center (LOC) 120 including a "server complex" implemented according to some embodiments of the invention. The server complex, otherwise referred to herein as a presentation preparation system can include the components indicated in FIG. 3 as included in the LOC 120. FIG. 3 also illustrates the LOC data flow 300. As mentioned previously, the LOC 120 can be either independent of, or co-located with, the H/E 135 of a local distributor 130. The local distributor 130 can be a cable television operator, a telephone company, or other local exchange carrier (LEC).

FIG. 2 and FIG. 3 illustrate how the interactive system of the present invention is designed to service many users who reside in different geographical locations, and with reference to FIG. 4, how the InDiSPensible system can evolve into a nationwide network. There is an indication of how real-time services (such as those available on the Internet, for example) can interface with the same components which process stored programs within the present invention. FIGS. 2, 3 and 4 show how the LOC 120, ROC 110 and NOC 100 communicate with each other within the InDiSPensible system hierarchy; there is also an indication of how user, information provider, and service-provider (commercial client) support services can be incorporated within the InDiSPensible System.

Local exchange carriers (LECs), cable television operators, regional telephone (or Bell) operating companies (RBOCs) and others have been constructing two-way communications facilities between their equipment offices and user sites. The facilities include optical fiber, coaxial cable, twisted-pair cabling, over-the-air broadcast, cellular and a variety of hybrid combinations.

More recently, new outside plant facilities are being implemented as two-way hybrids of optical fiber and coaxial cable. However, some hybrid combinations include one-way cabling for both broadband and narrowband communication to the home, and telephony or wireless transmission for narrowband communication from the home.

InDiSPensible System Presentation Data Storage and Retrieval

The InDiSPensible system 100 can include any combination of the NOC/ROC/LOC/head-end/hub/transmission facilities as long as the transmission media provides adequate data throughput rates as described below. In any case, presentation data is communicated from the LOC 120 to a distributor or operator "head-end" 135 via a complex 2-way distribution network 148. The 2-way distribution network 148 can include some combination of sub-networks such as broadband digital wide area networks, broadband metropolitan area networks, broadband local area networks, broadband and narrowband fiber-optic, coaxial cable and twisted pair networks as available from a number of local distribution providers. Various network segments may be long-haul or short haul, and they may be terrestrially cabled or broadcast over-the-air.

Information and program-service providers can, in concert with a national operating center 105, create services intended for a national audience. The service providers can also create a number of different offerings intended for regional or local audiences.

The InDiSPensible System is configured such that a single national operations center (NOC) 105 is capable of servicing some number of regional operating centers (ROCs) 110. Each ROC 110 is capable of servicing some number of local operation centers (LOCs) 120. The number of local distributor/operator head-ends (H/E) 135 that a particular LOC 120 can service is governed primarily by the number of potential users that are within the service areas of the respective head-ends. A LOC 120 contains a server complex that is scalable to both the number of anticipated simultaneous transactions and the number of presentations to be housed within the LOC's data bases. Thus, depending upon these factors, and the business relationship between the local distributor 130 and the InDiSPensible system operator, the LOC 120 can be co-located with other equipment attendant to operation of a master head-end 135, or can be operated as an independent entity within the metropolitan area or geographic region within which the local distributor 130 operates.

Incorporated within the InDiSPensible system 100 are processing resources providing "storage and information on demand." This capability enables the InDiSPensible system 100 to easily and economically expand and adapt to the changing requirements within a specific local operating area without burdensome external supervision.

This storage adaptability feature is valuable because, among other reasons, the most often retrieved presentations in one part of a metropolitan area may differ from those most often retrieved in another part of a metropolitan area by virtue of user demographics and affinity groups.

Whenever a user 160 requests specific information or presentations, the LOC 120 AVTS 350 checks to see if the request can be fulfilled locally by checking the request against the presentation data available in the LOC 120 presentation database 301. If the request cannot be fulfilled locally, the LOC 120 could request the importation thereof from other LOCs. However, because the request to another LOC 120 would have to proceed through the corresponding regional operating centers (ROCs) 110 for forwarding to another LOC 120, two hops to the second LOC and two hops back would be required to so forward the request.

On the other hand, only one hop from the LOC 120 is required to forward the request to the ROC 110 that provides update and other services to the LOC. Therefore, to minimize the number of hops required to obtain the information, the preferred system proceeds to request the import of the presentation from the ROC 110, if the request cannot be fulfilled locally by the LOC 120 corresponding to the requesting user 160.

As shown in FIG. 3, the request to the ROC 110 proceeds as follows. First, the system controller (browser) 330 at the LOC 120 determines where a requested presentation is stored. When a presentation is identified within the LOC 120 presentation database 301, the request is forwarded to the audio video terminal server (AVTS) 350 for fulfillment.

Upon determining that the requested presentation is not locally available, the system controller (browser) 330 forwards a request for the presentation to the LROC Router 310. The LROC router 310 transmits the presentation through appropriate inter-office facilities, such as the interoffice transport multiplexer 355 and the LH B-MAN 115, to the RLOC router 430 at the ROC 110.

The RLOC router 430 forwards the request via the input server 325 to the ROC system controller 330. The ROC system controller 330 passes the request to the ROC audio video terminal server (AVTS) 350 at which the presentation is assembled, from elements within the ROC presentation database 301.

The presentation is then forwarded to the ROC data multiplexer 360 and the ROC transport multiplexer 365 for transport on the LH B-MAN 115 to the LOC inter-office transport de-multiplexer 355. The presentation is then forwarded to the LOC AVTS 350 from which it is forwarded to the appropriate H/E 135 for delivery to the requesting user. Note that the if the request cannot be fulfilled by the ROC 110, then the ROC system controller 330 forwards the request to the NOC 105 for fulfillment. The request proceeds from user to H/E 135 to LOC 120 to ROC 110 to NOC 105 with presentation assembly and delivery from NOC to ROC to LOC to H/E to user.

By storing data as it is requested by the nearest users 160, a local operating center 120 maintains a cache of the information, and services database files most frequently requested by users 160 served from that particular local operating center. As shown in FIG. 3, this cache of information is stored in the LOC 120 presentation database 301. Data is thereby ready for inexpensive retrieval with the least response time. With a finite storage area in the LOC presentation database 301, the least requested data is eventually overwritten, thus insuring a dynamically optimized, self-refreshing database cache.

Easy maintenance and expandability of the system is further assured by an architecture which employs a plurality of parallel processors and servers to operate on an equally ranked basis to provide an efficient distributed processing capability at each of the system operating centers. Loosely coupled to one another, the processors and servers independently execute processes that meet the functional requirements of the system. The servers and processors share data from the same databases while avoiding conflicts with one another.

InDiSPensible System Expansion

Within the cabled transmission environment of the typical local distributor 130, 6 megahertz (MHz) is the bandwidth allocated to the carriage of conventional analog television signals. Consequently, for purposes of flexibility in channel assignment, 6 MHz is the bandwidth assigned to the distribution of digital services. At the time of this writing, the use of MPEG digital compression techniques in the InDiSPensible System minimizes the bandwidth required for an individual presentation data stream. Also, the use of QAM digital modulation techniques maximizes the number of MPEG-compressed presentation streams that can be carried simultaneously within a given 6 MHz bandwidth. Note that in the case of over-the-air distribution techniques, digital VSB (vestigial side-band) have proven more efficacious than QAM techniques.

The InDiSPensible system 100 is readily expanded to accommodate bandwidth demand increases. As an illustration of this expandability, consider a metropolitan area comprised of 100,000 households (i.e., a population of roughly 300,000). If we assume a 60% market penetration of cable television in the given marketplace, there would be 60,000 subscribing households. During the "prime time" viewing hours of a broadcast day, rating services advise that 36,000 of these households are actively viewing some programming. If 5% of these households are taking advantage of the availability of interactive programming such as information acquisition, home shopping, games, and the like, we would expect 1,800 households to be "active" during prime time. If one-third of these are simultaneously active, we would have 600 simultaneously active users, or 1% of cable television subscribers.

Past viewing statistics show that the average user views a still-frame image for approximately 12 seconds. Each image comprises an average of 40,000 Bytes, or 320,000 binary digits (bits). Therefore, the video bandwidth per average user is approximately 27,000 bits per second. A typical user receives audio along with the video approximately 50% of the time. The audio signal requires 64,000 bits per second (bps) for quality performance; this implies an average transfer rate of approximately 32,000 bps.

When only still-frame images are encoded according to MPEG techniques, each frame can occur within the MPEG elementary stream as an independent "I-frame." This frame arrangement is used for still-frame only images because the images are non-contiguous and therefore provide no opportunity for the "motion estimation compression" available for motion video processing. The MPEG I-frame elementary stream inclusive of 4-byte headers is packetized at 188 Bytes per packet.

Incremental video images can also be provided as presentation data multimedia elements. In some embodiments, dynamic image elements, sometimes referred to as data overlays, can be MPEG P-frames with relatively few changes—perhaps only 4 pels. As an example, 4,500 pels of overlay during the viewing interval equates to 36,000 bits over 12 seconds, or an average of 3,000 bps. The average user, within the operating area so defined, thus requires about 62,000 bps (27,000+32,000+3,000) for the video, audio and overlay data. The required "channel bandwidth" of an MPEG channel to serve the 100,000 home area is (600×62,000), or 37.2 Megabits per second.

An encoded data transmission channel can be defined in terms of the 6 MHz NTSC Television bandwidth, configured to simultaneously carry many simultaneous and independent encoded streams of data. In cabled transmission media, Quadrature Amplitude Modulation (QAM) is the preferred signal modulation technique. QAM is based on the same principles as basic amplitude modulation except that, in the case of the QAM technique, two carrier signals are transmitted simultaneously. The two carrier signals are at the same frequency, with a 90 degrees phase shift. The mathematical form of the transmitted signal will be as follows:

$$S(t)=A^* \sin(Wc^*t)+B^* \cos(Wc^*t)$$

A and B are the amplitudes of the two carrier signals. Each of the amplitudes can have a value from a known set of values. In this way a few bits can be transmitted in the period of one symbol time. For example consider the set of values {0, 1, 2, and 3 }. In this example 4 different values can be represented by 2 bit symbols as 00, 01, 10, 11. During one symbol time two bits will be transmitted using a quadrature technique where "A" represents 2 bits and another 2 bits is represented by "B". Four bits can be transmitted during one symbol time, and fifteen different values can thus be represented.

"64-QAM" permits a bit-rate throughput of about 27 Mbps within a 6 MHz bandwidth, while "256-QAM" permits 37.2 Mbps within the same 6 MHz bandwidth. A 256-QAM modulated channel can thus transport 600 simultaneous users as defined above.

Increases in user activity, and/or market penetration, can require additional 6 MHz channels within the local distributor's 130 available transmission spectrum in order to serve the metropolitan area described above. The need for additional physical channels can be obviated, in some circumstances through creation of a virtual distribution network with a capacity greater than that physically available by means of "drop and insert" techniques that offer spectrum reuse. In one example, 50 channels of programming are trunked to a particular hub. From that hub, 5 different distribution cables could each carry 10 channels with the same channel assignment from a television channel-tuning point of view. But, the 10 channels viewable in any one of the cables can be different from the 10 channels viewable in any of the other four cables.

Presentation Video and Audio Data Conversion and Storage

Pre-mastering is the process for creating databases of individual images, audio files, overlay text and graphics as elements in designing presentations. It is sufficient for this discussion to note that the multimedia data objects can be created by any of a number of available, standardized and proprietary authoring-software packages.

The storage of video files 302 is independent of the storage of audio files 304; and both video files 302 and audio files 304 are independent of the storage of the image element files 306 (i.e., text, graphics, etc.) This independence is maintained because one or another of the file types (or elements) may require change over time while other elements of the presentation remain the same.

For example, text and overlay files can contain purchasing information, such as pricing and quantities in stock. This information is expected to change more often than the underlying video and audio data. The implication of having independent files is that, unlike the processing of conventional video, no playback timing or synchronization information is stored in any of the presentation databases. Rather, it is added along with a destination address at the audio video terminal server (AVTS) 350.

In some embodiments, as depicted in FIG. 3, presentation image data 370 comprising still-frame or motion video image data are processed using a video-encoding utility 373 after which the data appear as an encoded elementary data stream. The video encoding utility can include any combination of one or more of video-encoding software, hardware or digital signal processor (DSP) firmware. For some embodiments, the encoded elementary data streams are provided as MPEG variable bit rate streams so that "constant quality" is maintained.

A video packetized elementary stream (PES) conversion utility 376 then transforms the video elementary stream into a video packetized elementary stream. A video transport stream (TS) conversion utility 379 transforms the elementary stream to a video transport stream. The video transport stream is then stored within a database of video files 302, in the appropriate video format.

Similarly, the presentation audio data 380 are processed using an audio encoding utility 383 into an elementary stream according to a particular audio format or protocol such as AC-3 audio. An audio PES conversion utility 386 then transforms the audio elementary stream into an audio packetized elementary stream. An audio transport stream (TS) conversion utility 389 transforms the elementary stream to an audio transport stream that is stored within a database of audio files 304, in the appropriate audio format.

Other sources for presentation images and audio can be Internet service providers (ISPs) 345. The selection of an Internet option can appear on a scripted navigation screen as processed to a user's display device. Selection of that option by the user causes a message from the user APE 155 to be forwarded to an ISP 345 for fulfillment. Details on this process appear below in the "APE Display of ISP Presentations" section.

Presentation Text and Graphics Data Conversion and Storage

The conversion of data to form overlay image element files 306 including text and graphics is relatively trivial compared to the audio and video image files. Image overlay text and graphics data 390 are processed using a text and graphics conversion utility 392 to form encoded data suitable for rendering. The encoded text and graphics data is then converted into data rendered for display on imaging devices by the text and graphics renderer 349A, from which the rendered data is forwarded to the image element files 306 for storage at the LOC 120. The simplicity of the conversion of the image overlay text and graphics data 390 to form the overlay image element files 306 is fortuitous because the text and graphics databases are the most volatile, with the most frequent requirements for updating.

Another source for text and graphics overlays can be an Internet service provider (ISP) 345, as may have been identified by a hyperlink reference within a presentation appearing on a user display device. Selecting the hyperlink reference initiates a retrieval sequence which accesses the overlay from either ISP 345 source files or rendered cache within the presentation database 301 associated with the audio video terminal server 350.

The text and graphics can be superimposed upon a video image prior to transmission to a requesting user, or may be communicated independently of the video image transmission to APE 155. Such independent communication could be, for example, within one of the MPEG private data channels. In any case, the overlay of the text and graphics information on the video image can be accomplished by a bit-map, or by an MPEG P-frame referenced to a master I-frame at an APE 155 where the APE is typically disposed at the customer premises 150.

As an alternative to server generation of bit-mapped text and graphic overlays or P-frames from a LOC 120, a very small software program can be downloaded to APE 155 memory where it remains resident. The program can define a number of autonomous graphical objects (widgets) which are capable of modifying the appearance, and adjusting certain variables, of the most recently received presentation image. The widgets can operate from user input or upon receipt of a command from the server. The command is one of a reduced instruction set maintained at the server.

Examples of typical widgets are "dialog boxes" and "controls." A "control" is a graphical object (widget) capable of receiving a user or server input which results in a variable's change of state. A "dialog box" is a graphical object (widget) that does not represent any variables, but acts as a container for one or more "controls." Typical widgets are used to provide a virtual keyboard on a user monitor; to scale the size of text or a graphical object; to create, display and erase text; present status messages; and so on.

Auxiliary data transmitted to the APE 155 can be used to create a bit-map for overlay on the video segment of the presentation, or the data could be used to create an MPEG B-frame, or P-frame with overlay and information dynamically overlaid at the set-top.

APE Display of Internet Service Provider Presentations

Independent of presentations stored at local, regional and national operating sites, the software loaded in the APE 155 at the customer premises 150 can be used to display presentations resident at ISP 345 sites. The user initiates an Internet session by placing a user 160 request through the APE 155. The upstream path through the 2-way distribution facilities of the local broadband distributor 130 and through the input server 325 to the system controller 330 is the same as earlier described for the CATV presentations. The user 160 request can be directed to an Internet browser 340 of any of a number of available types, such as Microsoft's Internet Explorer or Netscape's Navigator, to a communications server 341, attached to a number of web browsers 342, each of which can direct the request to the appropriate Internet Service Provider 345.

The image returned by the ISP 345 is returned by the web browser 342, through the communications server 341, to the Internet browser 340. The Internet browser 340 then directs the presentation image to a source cache 347 from which a conversion utility or web data renderer 349 prepares the image for viewing by either a high-resolution, progressively scanned monitor (such as a computer display 175) or a low-resolution, interlace-scanned monitor (such as a television set 165).

Out-of-Band Server

Other functionality provided at the Local Operations Center (LOC) 120 shown on FIG. 3 is an out-of-band server 315. This is available to provide communications; to APE 155 on a frequency outside of that normally used to communicate presentations from the server complex to the APE. Alternatively, an MPEG data channel, as defined within the MPEG-2 profile, can also be used to provide the functionality within the frequencies used to communicate the presentations.

For the out-of-band server 315, the downstream communications frequency lies within the downstream spectrum of the local distributor 130, but outside the channel frequency to which the APE 155 is tuned to receive presentations. The out-of-band server 315 assists provision of such services as "global turnoff," APE and other addressing services, and the "infobar"; the infobar is a particular type of display for certain presentations.

Multiplexing Process and Data Flow

The real-time process of multiplexing within the InDiSPensible system 100 can be understood with reference to FIG. 2 and FIG. 3. Upstream requests from users 160 are communicated from a user remote 170 keypad or a personal computer input device 175 located at the customer premises 150 to an input server 325 located at the LOC 120. The user 160 request is first forwarded from the input device to a remote client, APE 155. The remote client forwards the request to the two-way distribution network 148, from which the request is received by the H/E 135.

The H/E 135 forwards the request to the SH B-MAN 125, from which the request is received by the H/E router 320. As shown in FIG. 3, the H/E router 320 is located at the LOC 120 and transfers data between the SH B-MAN 125 to the input server 325 and from the out-of-band server 315. The H/E router 320 then forwards the request to the input server 325.

CATV transmission via a two-way distribution system is preferred, but Telephone-CATV hybrid systems can be used to send upstream commands via a telephone using a dual-tone, multi-frequency (DTMF) dial-pad, or a modem or a wireless transceiver. A hybrid system can be used for the retrieval of presentations and overlays not only from the LOC 120, but also from Internet Service Providers (ISPs) 345. In either case, the user 160 request is forwarded to a system controller 330. The system controller 330 then feeds the request to an audio video terminal server (AVTS) 350. The AVTS 350 then retrieves the scripted audio, video and overlay segments, of the presentation, from their respective databases of video files 302 (e.g., MPEG-images), audio files 304 (e.g., AC-3 Audio segments), and digitally formatted overlay text and graphics image element files 306.

Presentations retrieved from the web can be displayed immediately, or they may be stored in a cache for subsequent display. In either case, a browser function disposed in the system controller 330 is requested by user 160 input to display a particular URL. The system controller 330 browser translates this URL, via an appropriate algorithm, into a form in which the URL would have been stored in the rendered cache 308. If the file exists, the system controller 330 browser is informed of the location of the I-frame and audio files necessary to display the content. The system controller 330 browser then requests the AVTS 350 to play the content.

The AVTS 350 then reads the data, creates the appropriate full and partial (for scrolling) I-frame and or P-frames, and streams the frames through one of a plurality of encoded data multiplexers (MUXes) 360A to 360X. The number of encoded data MUXes 360 provided in a particular LOC 120 depends on:

1) the number of simultaneous users that can be served within the throughput capacity of the encoded data transport multiplexer 365 that interfaces with the SH B-MAN 125 at the LOC 120, and
2) the corresponding capacity of the encoded data transport demultiplexer 225 at the other end of the SH B-MAN 125 at the head-end 135.

The functions provided by the encoded data MUXes 360 are described below in this section.

For some embodiments, each simultaneously delivered presentation includes an MPEG data stream including video, audio, text and/or graphics accompanied by a script delineating the timing and format for these elements. A transport data stream is assembled at the transport multiplexer 365 from some number of the MPEG data streams emitted from their respective data multiplexers 360A to 360X. The transport stream is disassembled at the head-end transport demultiplexer 225 for presentation to the xQAM modulators 250A to 250X, up to the limit of their capacity for simultaneous MPEG data streams. In other embodiments, the data stream can be encoded using techniques that are not provided in the MPEG specification.

The throughput of the various LAN's, MAN's and WAN's described herein are determined by the common carriers from whom they are available, and therefore can vary from geographical area to geographical area. Therefore, the common basis used for analysis herein is the bit-rate of the individual MPEG data streams, and even the MPEG data streams vary within a range that depends upon the data objects included in the composite data object.

The multiplexed MPEG data streams, as assembled within the one or more QAM modulators 250A to 250X at the head-end 135, appear within the distribution network 148 monitored by each unit of addressable processing equipment 155. Recognition of an address match within the MPEG packet headers causes the processing of the data packets for display at the viewing device of the requesting user 160.

In the event that a user has requested a presentation generated by an Internet Service Provider 345, the system controller 330 at the LOC 120 initiates a search of the rendered cache library to determine the presence of the requested presentation. When no file is located in the rendered cache 308, the system controller 330 browser requests the crawler 340 to fetch the URL from the appropriate ISP 345. The crawler 340 connects to the web server specified in the URL and retrieves the hypertext mark-up language (HTML) or television mark-up language (TVML) file from the ISP 345, and writes it to the source cache 347. The crawler 340 then reads the file to determine if any other audio or image assets need to be retrieved. If so, they are fetched. The crawler 340 continues to update the system controller 330 browser as to the number of retrieved assets and how many remain to be fetched.

When the process is complete, the system controller 330 browser directs the web data renderer 349 to convert the file set in source cache into the stored format of the rendered cache 308. The web data renderer 349 informs the system controller 330 browser of completion. After verification of the file location, the system controller 330 browser then notifies the AVTS 350 to play and stream, as before.

All of these data objects are introduced to a specifically configured encoded data multiplexer 360. The encoded data multiplexer 360 can be one of a number of "cards" in "slots" of the AVTS 350 that assigns packet identification (PID), a program association table (PAT), a program map table (PMT), and a program clock reference (PCR) to each data object. The destination address and transmission path indications are added by the encoded data multiplexer 360 to each data object through the assignment of the appropriate program map table (PMT) for each requesting user 160 and program association table (PAT) for each data object to be directed to the PMT.

As discussed above, the PID is used together with a server identification (frame-gate) signal and a software algorithm to identify the user-APE from which a presentation request is issued.

The PCR provides a program clock reference for all users. The PCR also assures that audio and its associated video segments remain synchronized.

The PAT defines the program number that is a pointer for the PMT for a specific requesting user. The PMT indicates to addressable processing equipment in the presentation system, where in the transport stream to locate the particular video, audio and data segments of the presentation.

There are separate multiplexer buffers for control, audio, video and graphics data, assembled in that sequence. The number of audio buffers is equal to the number of simultaneous users. To further broaden the earlier example with a variation in assumptions, if the average viewing time per 40,000-byte average video frame is 10 seconds, and audio is present for 50% of the viewed frames, the number of resulting simultaneous users is 415.

The calculation proceeds as follows. The average video frame has 320 kbits. If the average viewing time for a frame is 10 seconds, the video bit rate requirement per user is 32 kbits per second. If we assume that the 64 kbit audio signal is provided to 50% of subscribers, then the audio bit rate requirement is also 32 kbits per second per user, or a total of 64 kbits per second per viewer. The inclusion of dynamic imaging at a rate of 1,000 bps raises the average rate per viewer to 65 kbps. For a 64 Quadrature Amplitude Modulated (QAM) modulated channel having a throughput of 27 Mbps, the average total number of users is equal to the throughput (27,000,000) divided by the total bit rate per user requirement (65,000), or approximately 415 average simultaneous users.

Given a 64 Quadrature Amplitude Modulated (QAM) transmission stream, the addition of a real-time 65 kbit channel equates to the addition of one new packet for every existing 405 packets. The new packet insertion rate of 1/405 is a consequence of the actual throughput of a 64 QAM stream being 26.970534 Mbps, and because, due to overhead requirements, the actual channel width for the addition of 65 kbits of real-time information is more than 65 kbits. Synchronization of real-time audio and video can be accomplished by adding or dropping video frames as required by the transmission stream throughput and the size of the additional real-time channel.

The data stream for MPEG-2 comprises 188-byte packets. In addition to encoded video, encoded audio and auxiliary data, these packets contain network information such as PAT, PMT and PCR. The basic transport stream (TS) packet contains a 4-byte, or 32 bit, header. Thirteen of the thirty-two bits are used to define a PID; 8192 addresses are adequate for specifying video, audio, data and PMT for as many as 2,048 simultaneous users. Additionally, the TS header accounts for continuity such as errors, missing packets, etc. Transportation stream information is initially added to the elementary stream data object packets by the corresponding TS conversion utility, e.g., 379, 389, 392 or 349. The encoded data multiplexer 360 incorporates the transport stream information into the encoded data stream TS header.

Between the TS Packet Header and the encoded content is a packetized elementary stream (PES) header which includes a decode time stamp (DTS) based upon image complexity (a 90 kHz clock) and a presentation time stamp (PTS), based upon 30 frames per second per NTSC specifications for North America. Packetized elementary stream information is initially added to the elementary stream data object packets by the corresponding PES conversion utility, e.g., 376, 386, 392 or 349. The encoded data multiplexer 360 incorporates the packetized elementary stream information into the encoded data stream PES header. The time boundaries between start-of-playback, DTS and PTS are specified to prevent "picture rolling" within the analog time constraints of NTSC transmission. The timing is not as critical for stills as for motion video.

The encoded data multiplexer 360 thus divides the encoded data stream into a framework consisting of x slots. The number of slots is based upon the minimum data rate of the user-requested information. For example, if the user requested information contains constant-bit-rate, 64 kbps audio and the block data rate for the destination NTSC channel is 27 Mbps (64-QAM), the frame contains 405 packets. The algorithm to be used for creating the frames is then:

1. Transmit control and network information as required;
2. Transmit timing information (PCR) as required;
3. Transmit constant data rate information such as user audio (one packet for monaural and two packets for stereo to the maximum number of simultaneous users); and,
4. Transmit variable data rate information such as video and/or auxiliary data, throttling as required to maintain synchronization between audio and video.

Network information inserted by the encoded data multiplexer 360 includes the PID, continuity checks—error counts, missing packets, etc., DTS and PTS. These data are inserted into each data stream transmitted in response to a user 160 request.

The encoded data multiplexer 360 provides system timing (via the PCR) that is the same for all system users 160. The encoded data transport multiplexer 365 handles both a constant bit rate and a variable, or throttle, bit rate.

As an example, consider the case of a block data rate of 26.970534 Mbps (i.e., 64 QAM) and 405 packets per frame. The data rate for a single packet per frame is 66 kbps, or 64 kbps after overhead. If the audio is 64 kbps, a packet per frame is forwarded. And if audio is 128 kbps, 2 packets of audio are transmitted to the appropriate user per frame. This can be extended to any data rate. For example, 3 Mbps can be achieved if 48 packets per frame are required by any specific user.

For variable bit rate coding, the number of transmitted bits per unit time may vary on the channel within the specified MPEG limit, 15 Mbps for MPEG-2. The goal of variable bit rate coding is to provide constant quality coding. One example of variable bit rate coding is the constant quality coding used herein when the video element of a presentation is a still frame image.

Regional Operations Centers

For the first location in which the InDiSPensible System is implemented a first Local Operations Center 120A with its server complex capacity scaled to the anticipated simultaneous session activity would look functionally as is represented on FIG. 3. Temporary additions can include: the provision of facilities attendant to maintaining customer service as well as technical support for both local distributors and users; and provision for assisting information and service providers with the preparation of their presentations.

As the number of potential users increases, the capacity of the server complex will be expanded to the limits of equipment and facilities capacity. As the user activity further increases, a second local operations center (LOC) 120B will be added within the region. The second LOC 120B is the functional equivalent of the first except that the centralized customer and technical support facilities need not be replicated. Also, in segmenting the market, the user activity may differ from one LOC 120 to the other in terms of presentation content. At this point one of the operations centers would be identified as a regional operations center 110, and become the central focus for client, distributor and user services support.

FIG. 4, illustrates the linkage between one or more Local Operations Centers 120 and a first Regional Operations Center 110$_A$ serving the LOCs 120. The first Regional Operations Center 110$_A$ retains the characteristics of a Local Operations Center 120, but adds means to transfer presentations and presentation data base updates not only to LOCs 120 but also to other ROCs 110$_B$ through 110$_X$, as they are implemented. The set of LOCs 120 within region 1 are served by the first ROC 110A; a different set of LOCs 120-within region 2 are served by a second ROC 110B, and so on.

FIG. 4 shows a Customer Service Center 405 disposed in the first ROC 110$_A$. The customer service center 405 services users 160 throughout the region covered by the first ROC 110$_A$. The customer service center 405 is connected to local access points (LAPs) 396 by metropolitan and/or wide area networks 395. The LAPs 396 are provided for users 160 that initiate requests for information or services in regard to the InDiSPensible system 100 using a plain old telephone system (POTS) 398. There is also a communications link from the ROC 110 to the National Operations Center (NOC) 105.

National Operations Center

In a fashion equivalent to that described for the evolution from LOC's to ROC's, the emergence of a second ROC 110B results in the identification of one of them as a National Operations Center (NOC) 105 thus providing the single point of contact for the partners who prepare presentations for users in all of the (or selected) regions in which InDiSPensible system 100 services are provided. The hierarchy as described provides the means to distribute from a single NOC 105 presentations to each ROC 110 as appropriate to the users resident within that region.

Similarly each ROC 110 distributes presentations and updates to the LOCs 120 within its region. The LOCs 120 can, by agreement with one or another of the local distributors 130, tailor available presentations accessible by users resident within the operating territory of the local distributor. A ROC 110 can operate functionally as a LOC 120 for local distributors 130 in its immediate area. Likewise, the NOC 105 can operate functionally as both a ROC 110 and a LOC 120 for local distributors in its immediate area.

FIG. 5 shows the national operations center 105 that serves multiple ROCs 110. The server functionality is the basically the same as for the ROCs 110 and LOCs 120. However, the scale of the operation differs because the NOC 105 is the central repository of all images distributed to the ROCs 110 and ultimately to the LOCs 120. A Customer support center 505 and a commercial client support center 515 are also provided in the NOC 105. The commercial client support center 515 is connected to client authoring stations (CAS's) 510 through a CAS B-MAN/WAN 512.

Interactive Distribution of Selectable Presentations (InDiSPensible) Method

The invention provides a method for distributing presentations via a network from a presentation preparation system to remote clients referred to herein as the interactive distribution of selectable presentations (InDiSPensible) method. The InDiSPensible method includes providing a presentation preparation system, and establishing a bi-directional communications connection between a first remote client and the presentation preparation system. The method also includes transmitting a user identification and an indication of a transmission path to the presentation preparation system, transmitting an indication of a user selection of a first presentation, and receiving an encoded digital data stream including portions of the first presentation. The encoded digital data stream can include multimedia elements encoded according to MPEG techniques.

The presentation preparation system is adapted to distribute presentations via a complex network to remote clients. The user identification and the indication of the transmission path are transmitted by the first remote client via the bi-directional communications connection. The user identification includes a destination address corresponding to the first remote client. The first presentation includes selectable data objects including multimedia elements. The presentation preparation system is also referred to herein as the server complex.

The InDiSPensible method can also include retrieving the selectable data objects corresponding to the first presentation from data sources, transforming the data objects into addressed data objects, assembling an encoded digital data stream formatted for processing by the first remote client, and transmitting the encoded digital data stream to the first remote client. The transforming of the data objects into addressed data objects includes the presentation preparation system assigning and attaching the destination address and the transmission path indication to the selectable data objects.

The assembling of the encoded digital data stream is performed by the presentation preparation system and can include encoding the addressed data objects according to MPEG techniques. The encoded digital data stream includes the addressed data objects. The encoded digital data stream is transmitted from the presentation preparation system to the first remote client over the transmission path.

The InDiSPensible method can also include the presentation preparation system combining a plurality of uniquely-addressed encoded digital data streams to form combined data streams. The presentation preparation system transmits the combined data streams via complex communications networks to local distribution platforms. The local distribution platforms assemble portions of the combined encoded data streams to form assembled data streams. The complex communications networks can include one or more of broadband wide area networks (such as the B-WAN 109) and broadband metropolitan networks (such as the LH B-MAN 115).

The local distribution platforms forward the assembled data streams to distribution networks. The distribution networks include lines that pass input ports of the remote clients. The remote clients include addressable processing equipment 155. Responsive to assembled data streams having addressed data streams with addresses corresponding to the remote clients and passing the input ports, the remote clients receive the addressed data streams.

The InDiSPensible method can also include the first remote client transmitting a log-on request to the presentation preparation system. The log-on request includes the user identification. In response to the log-on request, the presentation preparation system assigns a user number to the first remote client. The presentation preparation system and the first remote client generate encoded header packet identification numbers (PIDs) for the multimedia elements by using an algorithm. The multimedia elements include one or more of video, audio and graphics data. In response to the indication of the user selection, the assembling includes placing the PIDs in the addressed data objects, the PIDs constructed to include the user number.

The data sources can include databases of one or more of video, audio and data transport stream files. The databases include a first group of databases disposed with the presentation preparation system and other databases located remotely from the presentation preparation system. The other databases include Internet service provider maintained databases. InDiSPensible method can includes the presentation preparation system constructing semantic context to describe locations, file sizes, definitions of hyperlinks, and descriptions of animations and other dynamic content.

The multimedia elements can include still-frame video images and accompanying audio. The InDiSPensible method can include encoding each audio data object and each video data object with timing information prior to the assembling step. During the assembling step, the destination address and the timing information can be inserted into headers attached to the encoded digital data stream.

The multimedia elements can include still-frame video images. The transmitting of the encoded digital data stream can include one or both of a variable-bit-rate delivery and a constant-bit-rate deliver of motion video. The InDiSPensible method can include displaying the motion video on a display device disposed at customer premises 150. The motion video display corresponds to a still-frame common program clock reference for a fractional frame overlay of a first image on a second image. The first image and the second image comprise one of a still-frame video image and a motion video image.

The encoded digital data stream can be formatted according to MPEG techniques. The assigning and attaching performed for each selectable data object can include a first transforming of each selectable data object into an MPEG elementary data stream. The first transforming can include attaching time stamp information to the MPEG elementary data stream. The assigning and attaching performed for each selectable data object can also include a second transforming of the MPEG elementary data stream into an MPEG transport data stream. The second transforming can include attaching packet identification information.

In some embodiments, a first server (such as the AVTS 350) in the presentation preparation system streams data objects through a first group of encoded data multiplexers 360A-360X. The AVTS 350 and the first group of encoded data multiplexers 360A-360X can be disposed at a first operations center, such as a first LOC 120 (or a ROC 110). Each of the first group of encoded data multiplexers 360A-360X receives encoded data related to a corresponding presentation.

The assembling can include each of the encoded data multiplexers 360A-360X adding packet header information to the encoded data to form addressed composite data objects. The assembling can also include a transport multiplexer (such as the encoded data transport multiplexer 365) receiving the addressed composite data objects from one or more of the first group of encoded data multiplexers 360. The encoded data transport multiplexer 365 can be disposed at the first LOC 120. The assembling can also include the encoded data transport multiplexer 365 assembling a transport data stream from data received from one or more of the encoded data multiplexers 360.

Transport de-multiplexers (such as the encoded data transport demultiplexers 225 can disassemble the transport stream to provide the data to channel modulators (such as the X-QAM modulators 250. Each of the X-QAM modulators 250 can have a corresponding data rate capacity. The quantity of data provided by the encoded data transport demultiplexers 225 can include data rates up to the corresponding capacity of each of the X-QAM modulators 250. Each of the X-QAM modulators 250 can distribute a stream of data to addressable processing equipment 155 via a bi-directional distribution network (such as the combination of the of a two-way trunking network 140, a distribution hubs 145A-145X, and a two-way distribution network 148) identified by the transmission path.

The assigning and attaching can include each encoded data multiplexer 360 of the first group dividing the data stream into a framework. The framework can include a first number of slots. The number of slots can correspond to a minimum data rate of the first presentation. The dividing can include forming frames. The data can be inserted in each frame by one of the first group of encoded data multiplexers 360 according to the following priority:
  first, inserting transmit control and network information;
  secondly, inserting timing information;
  thirdly, inserting constant data rate information; and
  fourthly, inserting variable data rate information.

The constant data rate information can includes audio data, and the variable data rate information includes video data. The inserting of the variable data rate information can include throttling of the variable data rate information to maintain synchronization between the audio data and the video data.

The remote clients can comprise addressable processing equipment (APE) 155. The addressable processing equipment can be connected to display equipment. For such APE, the method can include implementing the distributing method for a first group of remote clients. At least one of the remote clients in the first group receives encoded digital data streams having destination addresses corresponding to the APE 155 of the at least one remote client. The APE 155 of the at least one remote client decoding the received encoded digital data streams for viewing on corresponding display equipment.

In some embodiments, the remote clients are located on user premises. The establishing of the bi-directional communications connection includes transporting addressable communications to and from the remote clients and to and from servers using distribution facilities. The distribution facilities are adapted to establish a plurality of transmission paths for the transporting. The transmission paths are adapted to pass a plurality of the encoded digital data streams.

The servers can be disposed at remote server locations apart from the local distribution facilities. The remote server locations can include one or more of intermediate operating sites (such as ROCs 110 and LOCs 120), head-ends 135, trunking hubs and distribution hubs 145. The distribution facilities are adapted to transmit addressed messages corresponding to the network destinations and the remote clients.

The InDiSPensible method can include distributing the presentations to a group of remote clients, appending or attaching a path identification to messages from the remote clients, and transmitting the presentation data to the remote clients through corresponding hubs. The remote clients in the group have different transmission paths. The transmission paths include hub-processing resources disposed at distribution hubs 145. Each of the distribution hubs 145 has either a destination addresses, or a dedicated route.

The hub processing resources perform the appending or the attaching of the path identification to the messages from the remote clients. The path identification is adapted to inform the presentation preparation system receiving the messages of the distribution hub destination addresses corresponding to the messages. The presentation preparation system transmits the presentation data to the remote clients through the corresponding hubs.

The data objects can include one or more of images, audio, text, graphics commands, and scripts. The InDiSPensible method includes playing and displaying the first presentation. The playing and displaying include sequencing the data objects according to a script during the playing and the displaying.

The multimedia elements can include one or more of still-frame video image data, motion video data, animated video data, static and dynamic text and video overlay data, background audio data, audio segment data, and reduced instruction set commands. The video data can be adapted to provide fractional screen viewing and full screen viewing. The method includes playing and displaying the first presentation. The playing and displaying can include providing fractional screen viewing and full screen viewing.

The multimedia elements can include still-frame video images. The presentation preparation system can include one or more data encoding multiplexers including a first data encoding multiplexer, such as an encoded data multiplexers 360. The InDiSPensible method can include the first encoded data multiplexer 360 examining a first set of packets in the encoded digital data stream. In response to a priority program clock reference and a packet identification for the first set of packets indicating a drop and insert criteria, the presentation preparation system replaces the first set of packets with a second set of packets.

Each of the encoded data multiplexers 360 can be adapted to assign and attach the destination address and the transmission path indication to the selectable data objects to form addressed data objects. The replacing is adapted to accommodate a data rate capacity limitation of an encoded data transport multiplexer 365 by delaying transmitting of a first addressed data stream including the addressed data objects and transmitting a second addressed data stream before transmitting the first data stream. The second data stream has a lower data rate than the first data stream.

The replacing can be adapted to synchronize the addition and deletion of selected packets in the multimedia elements in the first presentation.

The second set of packets can correspond to a delayed data stream, transmission of the delayed data stream from the presentation preparation system having been initially set for an earlier time.

The presentation preparation system can be disposed at a local operating center 120. The local operating center 120 can be connected to the remote client by a local distribution network, such as the combination of the two-way trunking network 140, the distribution hubs 145A-145X, and the two-way distribution network 148.

The local operating center 120 can have an encoded digital data stream transmission capacity corresponding to a maximum number of simultaneous users. Each of the simultaneous users transmitting indications of corresponding user selections.

The InDiSPensible method can include the local operations center 120 responding to more than the maximum number of simultaneous users by transmitting encoded digital data streams to remote clients over the transmission paths for a first number of simultaneous users. The first number is no greater than the maximum number of simultaneous users. The local operations center 120 response to more than the maximum number of simultaneous users can also include transmitting one or more of: delayed encoded digital data streams to remote clients for the remaining simultaneous users, and a signal adapted to trigger display based on data stored within addressable processing equipment 155 corresponding to the remaining simultaneous users.

The InDiSPensible method can include the presentation preparation system responding to receipt of indications of user selections from users by processing and transmitting the selected presentations to the users. The presentation preparation system response to the receipt of the indications of user selections from the users also includes prioritizing the processing and transmitting of the motion video images and the still frame images using software algorithms based upon MPEG-encoding statistics.

The InDiSPensible method can include presentation system processing resources encoding non-selected data with a server complex identification. The presentation system processing resources transmit encoded non-selected data to remote clients. The remote clients have processing resources. The InDiSPensible method can also include establishing a communications network connection between the presentation system and a first remote client. The first remote client processing resources detect the server complex identification. Upon establishing the communications network connection, the first remote client processing resources transmit a transmission path indication to the presentation system by means of the communications network connection.

The InDiSPensible method can be initiated by a user establishing a telephone line connections with a presentation system. Upon establishing the telephone line connection, the presentation system processing resources identify the destination address and the transmission path from one or both of the user calling number identification and a database of user information. The remote client processing resources transmit a request for a selected presentation to the presentation system via the telephone line connection. The presentation system processing resources retrieve data related to the selected presentation from data sources. The presentation system processing resources assemble the data to form an encoded digital data stream including a destination address associated with the remote client, and the transmission path for the remote client. The presentation system transmits the encoded digital data stream to the remote client over the transmission path.

The InDiSPensible method can include establishing a communications path between a presentation system and a first remote client, and the first remote client requesting a first data object. The first data object corresponds to a selected presentation. The presentation system has processing resources including a system controller 330 and a central repository including one or more of video, audio, graphics and text, such as the presentation database 301 shown in FIG. 3. The presentation system and the first remote client are connected in a bi-directional distribution network. The InDiSPensible method can also include the presentation system processing resources assembling an encoded digital data stream corresponding to the first data object, and generating an addressable data object. The addressable data object includes the encoded digital data stream, an indication of a destination address corresponding to the first remote client, and an indication of a transmission path for the addressable data object. The system controller 330 associates the destination address and the transmission path for the addressable data object. The first remote client causes the playing and displaying of multimedia elements corresponding to the first data object.

The encoded digital data stream can be formatted according to MPEG techniques to form an MPEG data stream. The MPEG data stream includes image elements in the first data object. Prior to the assembling of the encoded digital data stream, the method can includes authoring tools creating multimedia elements. The data object includes the multimedia elements, the central repository is adapted to store multimedia elements created by the authoring tools.

The first remote client can receive presentations via a first channel. The first channel can be adapted to simultaneously transmit up to a maximum bit transmission rate. The prioritizing can be adapted to prevent exceeding the maximum bit transmission rate in the first channel.

The encoded digital data stream can include encoded multimedia element data, encoded auxiliary data, and network packet processing information data. The network packet processing information data can includes data corresponding to a program association table, data corresponding to a program map table, and data corresponding to a program clock reference.

The presentation preparation system can use a single program clock reference for simultaneous users of the encoded digital data stream.

Prior to the transmitting of the user identification, the InDiSPensible method can include a local distributor 130 assigning one or more channel frequencies for transmitting the addressed data objects to the remote clients. A user corresponding to the first remote client can select one of the channel frequencies by tuning the first remote client. The selected channel frequency can correspond to one or more presentation preparation systems including the presentation preparation system. The InDiSPensible method can also include the presentation preparation system transmitting a server identification signal including the transmission path to the remote client. The remote client detects and stores the transmission path.

The InDiSPensible method can also include a log-on request between the first remote client and the presentation preparation system. The log on request can include the first remote client transmitting the user identification to the presentation preparation system, the presentation preparation system transmitting a user number to the first remote client. The log on request can also include the presentation preparation system and the first remote client using the user number to encode and decode the first presentation.

In other embodiments, the log-on request between the first remote client and the presentation preparation system can include the first remote client transmitting the user identification to the presentation preparation system, and the presentation preparation system and the first remote client calculating from a common algorithm a user number. The user number can be adapted to identify packets passing from the presentation preparation system to the first remote client.

In some embodiments, a user initiates a session by tuning a "terminal," i.e., a remote client or addressable processing equipment 155, to a "channel frequency". The channel frequency corresponds to the location, or locations, within the local distribution transmission spectrum of one or more digital information sources. Upon receipt of a server identification signal, also referred to herein as a "frame gate signal," a response from the user terminal is triggered.

For embodiments of the InDiSPensible system 100 configured as shown in FIG. 1, a system user 160 can enter selection codes via a keypad (shown as user remote 170) and/or a keyboard (shown as a computer input device 180) supplied with a digital remote client [shown as addressable processing equipment (APE) 155]. The remote client or APE 155 can be an addressable modem external or internal to a personal computer, or it can be an addressable "set-top box" (STB). The STB can be provided by a cable television service distributor, or leased, purchased or otherwise acquired by the user 160. Upon selection by the user 160 of a designated channel, navigation menus guide the user across the available information and presentation options.

The user premises InDiSPensible process flow 600 for some embodiments of the InDiSPensible method is shown in FIG. 6. The user typically establishes a bi-directional communications connection between the LOC 120 and the remote client by tuning 610 the user remote 170 to the appropriate digital television broadcast channel. The remote client typically includes APE 155.

The APE 155 can be located at the remote client, or elsewhere in the bi-directional communications path between the H/E 135 and the remote client. For example, APE might be located at a distribution hub with user access provided by a wireless remote transmitting to an antenna located at the distribution hub and connected to the APE. The APE 155 automatically detects and stores 612 a path identification received via a "frame gate signal" from the appropriate LOC server complex. The frame gate signal is disclosed in U.S. Pat. No. 5,014,125, granted to Pocock et al. on May 7, 1991, which is incorporated herein by reference.

A log-on 620 process includes a request for a presentation and establishes InDiSPensible system 100 data parameters for the requested presentation. Upon receipt of the frame gate signal, the remote client (APE 155) begins the log-on request 620 by assembling and transmitting 622 to the LOC 120 server complex a request that includes the presentation request, the frame gate signal ID, the remote client (APE 155) address, and an indication of transmission path from the server complex to the remote client. Within cabled environments the transmission path identification typically identifies the primary or secondary distribution hub to which the user is connected, and the common carrier transmission path from LOC 120 to the hub 145. The path indication can be provided as a few bytes of the APE address. The path indication bytes can be assigned by the local distributor 130, or bytes can indicate a secondary address appended to the APE message by one of the active electronic devices within the upstream path of a local distributor's hub 145 or head-end 135. Upon receipt of the APE message at the LOC 120, a process within the LOC server complex then calculates and transmits 624 a "Simultaneous-User Number," calculated from the APE address, to the remote client (APE 155).

After the ATVS 350 transmits 624 the user number to the remote client, a corresponding encoded data slot, i.e., an MPEG data multiplexer at the AVTS, is made available for providing the presentation to the requesting user 160. Both the AVTS 350 and remote client/APE 155 then use the user number to, respectively, encode and decode messages between them.

The user number can be forwarded from the server complex to the remote client/APE 155 through the system controller 330, the input server 325, the H/E router 320, the SH B-MAN 125, the H/E 135, the trunking network 140, the distribution hub 145, and the two-way distribution network 148. Alternatively the user number can be forwarded to the remote client/APE 155 via the system controller 330 or the out-of-band server 315 via the head-end router 320. The user number can also be forwarded through the same path as the presentation.

One alternative embodiment is to use the APE address and other info to calculate 626 the user number from an algorithm resident at both the LOC 120 server complex and the remote client/APE 155. For this embodiment, the user number need not be forwarded at all, and would take on the characteristics of an encryption key thus providing an additional level or privacy and security to the bi-directional exchange of messages and presentations between remote client and server complex.

In other embodiments, all video PIDs can have the same number with temporal references to specifically identify users. As another alternative, program or presentation numbers could be identified as user numbers. Note that the APE 155 address can be adapted to the PID at either the AVTS 350 or the APE. Also, the algorithm can change during the process thus enhancing the security of the system.

After the log-on request 620, the system controller (browser) 340 confirms the presence of the presentation within local databases. Then, the AVTS 350 enters 630 the presentation request and retrieves presentation data elements from the appropriate presentation databases 301. After the ATVS 350 retrieves 634A the addressed data objects that make up the presentation and assembles 634B an encoded composite data object including the presentation multimedia elements and appropriate commands or scripts. The ATVS 350 then forwards 636 the composite data object to the APE 155. During the display of the presentation at the customer premises 150, the user 160 can input additional requests. As indicated at the "more user requests 640" decision block, if any additional requests are forwarded to the ATVS 350, the ATVS enters 630 the additional user request, and the determining 632, retrieving 634A, assembling 634B, and forwarding 636 steps are repeated for each additional request.

On the other hand, in some circumstances no additional user requests are provided at the "more user requests" 640 decision block. In these circumstances, after the server completes distribution 642 of the presentation to the APE 155, the user display device, TV set 165 or computer/display 175, continues display of the presentation until further user action occurs. The further user action can be selecting a new presentation, tuning to another program channel, or turning off the equipment. Also, after distribution of the presentation has ended at the LOC 120, the "Simultaneous User Number" is made available to, and the encoded data slot within the channel transmission path is cleared 644 for, another simultaneous user.

For embodiments using MPEG encoding, a video packetized elementary stream (PES) conversion utility 376 transforms the I-frame elementary stream into a packetized, MPEG I-frame PES. The MPEG I-frame PES is then transformed through a video transport stream (TS) conversion utility 379 and transferred as an MPEG I-frame transport stream to a database of video files 302 wherein such audio, video and data MPEG images are stored.

The InDiSPensible system 100 manipulates, processes and transmits all data destined for a particular user in a single, digitally formatted, encoded data stream. Transmission of all of the digital control, video, audio and graphics accompaniments to video image(s) occurs within a single composite data object, that is an MPEG data stream, thus resulting in the most efficient use of available channel capacity. In order to reach the user 160 display equipment, e.g., 165 or 175, the data stream is agglomerated at the LOC 120 by the transport multiplexer 365 with other such encoded data streams for transmission from the LOC 120 to the transport de-multiplexer 225 at the local distributor's 130 head-end 135 (or primary distribution hub). The output of the encoded data multiplexer 360 is an encoded data stream uniquely identified for the user who requested the presentation. This stream is combined with a plurality of such streams for introduction to an encoded data transport multiplexer 365 for processing and carriage from the LOC 120 within SH B-MAN 125 link to the H/E 135 that serves the requesting user 160.

At the H/E 135, the data transport stream, i.e., agglomerated encoded data streams, is separated at an encoded data transport demultiplexer 225 into the individual MPEG data streams.

After leaving the encoded data transport demultiplexer 225, the encoded data streams are re-multiplexed to adapt to the analog bandwidth capacity of a conventional NTSC TV channel. The re-multiplexing is performed at a digital modulator 250 to an operator-selected distribution frequency within the transmission spectrum of the local distributor. The transport data stream thus created includes a number of independent MPEG data streams each of which is representative of presentation data transmitted in digital form until reaching the APE 155. At the APE 155 the data can be reformatted for display as necessary.

The digital modulator can be an "x-QAM" 250A to 250X for a fiber-optic and/or coaxial cable operator, or a "digital vestigial side band (VSB)" modulator for a wireless operator. The digital modulator 250 feeds the channel assigned by the local broadband distributor 130 for the forwarding of presentations via encoded data streams. Examples of local broadband distributors 130 include cable operators, television broadcasters, satellite program providers, multi-point distribution system (MDS) operators, metropolitan MDS (MMDS) operators, local MDS (LMDS) operators, and local exchange carriers. Note that MMDS and LMDS operators typically operate at different frequencies than the MDS operators.

The encoded data streams are received by appropriate APE 155, which are locally distributed throughout the area serviced by the local distributor 130. Each APE 155 is individually addressed to intercept the digital data directed thereto. When a user 160 requests a particular presentation, the InDiSPensible system 100 enables delivery of the data required to construct the selected presentation only to the APE 155 address assigned to the requesting user 160.

Within the InDiSPensible system 100, all information necessary to serve users 160 is transmitted to customer-premise equipment within a single distribution channel in digital format. The InDiSPensible system 100 uses individually addressed, variable length blocks of data comprising digital representations of video images, audio accompaniment, graphics overlays, various scripts necessary to control presentation sequences, small packets of characters which echo user input commands on his display equipment (i.e., TV set or PC monitor), and software updates for the APE 155.

The destination addresses uniquely assigned to each APE 155 within the user universe can be organized in any number of ways. These groupings may be geographic (e.g., by postal zip code), or by affinity group (e.g., sports fans), or by profession (e.g., doctors), and so on. Consequently, some data may be sent continuously to all, or a subset of all, concurrent users of a pre-assigned channel by means of group or associative bits within the APE 155 address. Examples of such data are background music and ticker-tape crawls. A background ticker-tape data stream could be used to accompany headline information, weather announcements, stock market or sports reports, promotions, etc.

Consistent with the requirements for the communication of digital information in the encoded data format, the InDiSPensible system 100 provides a method for multiplexing the individual image elements within a user-specific, encoded data presentation data stream. Some number of individually directed encoded data streams are multiplexed into a composite channel data stream that is transported within a single, assigned distribution channel.

To provide this multiplexing, a clock provides timing for producing frame synchronization characters at fixed time intervals along the distribution channel. Each of these time intervals defines a frame whose start is denoted by the presence of the frame synchronization characters.

The location within the composite data stream of the various media segments that comprise any particular presentation is identified with reference to the timing characters: the decode time stamp (DTS) and the presentation time stamp (PTS). The DTS and PTS are created for the requested presentation by the appropriate timing-independent, media-component databases as available at the presentation assembly site. For example the video file database entry for the video component of a presentation includes PTS and a DTS for the video component, and the audio file database entry for the audio component of a presentation includes a PTS and a DTS for the audio component. The program map table (PMT) enables the addressable processing equipment 155 to match the respective media-components for a particular presentation.

APE 155 can be disposed at the customer premises 150. Details of the processing will vary dependent upon a specific APE 150 implementation. Typically, the APE 155 at the user premises is a set-top box. If we assume (for purposes of example) a 64-QAM system, a 27 Mbps stream will be available to the APE 155.

The concept of a "simultaneous user number" contributes to the InDiSPensible system 100 ability to manage a large universe of APE "addresses," or "identification numbers." Each APE 155 is assigned a unique binary address that may be as large as twenty bits or more. The twenty-bit address can provide 1,048,576 unique addresses. The PID (packet identification) within the encoded data packet header is used to direct requested information to the proper APE 155 and processing resources within the APE. But, the PID is defined by only 13 bits, i.e., 8,192 unique addresses.

When the APE 155 address appears in one of the encoded data streams carried within the QAM-based encoded data channel (and after forward error correction within the APE 155), 6 packet identifications (PIDs) are received by 6 addressable processing stations within the APE 155, or STB. Typically, PID-1 identifies the program map table (PMT)—that is, the PID address for video, audio, data and the program clock reference (PCR). PID-2 derives the timing location from the PCR. PID-3 contains the video information; data packets are forwarded to a bit-map generator for subsequent on-screen display. PID-4 assembles the data information into buffers, from which the information is directed to the Video Presentation Provider's software application via an appropriate Application Program Interface (API). The application prepares a second bit-map which overlays the bit-map from PID-4. PID-5 returns audio data packets to the AC-3 audio format, for playback as accompaniment to the video and overlay video display. PID-6 contains the program association table (PAT), and thereby controls the extraction of valid presentations by defining the PMT for each "program."

All the disclosed embodiments of the invention described herein can be realized and practiced without undue experimentation. Although the best mode of carrying out the invention contemplated by the inventor is disclosed above, practice of the invention is not limited thereto. Accordingly, it will be appreciated by those skilled in the art that the invention may be practiced otherwise than as specifically described herein.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended claims.

We claim:

1. A method for interactive distribution of selectable presentations from a presentation server to an addressable processing equipment at a user location, said selectable presentations each comprising multiple data objects, including at least one constant data rate data object, at least one variable data rate data object, at least one control object, and at least one timing information object, said method comprising:

in response to a request from said addressable processing equipment for a presentation, selecting and retrieving said presentation from a database of stored selectable presentations;

multiplexing said multiple data objects into a presentation data stream by placing said data objects in a frame;

multiplexing said presentation data stream with presentations requested by other users into a single MPEG digital video transport stream; and transmitting said single MPEG digital video transport stream to said addressable processing equipment with an address message indicating a location of said requested presentation in said single MPEG digital transport stream;

wherein said placing of said data objects into a frame comprises:

inserting said control data objects into said frame;

subsequently inserting timing information objects into said frame;

subsequently inserting said constant data rate objects into said frame; and subsequently inserting said variable data rate objects into said frame.

2. The method of claim 1 wherein said stored selectable presentations are converted to MPEG digital video format and stored in a presentation database memory.

3. The method of claim 2, wherein said selected presentation in MPEG digital video format is an MPEG I-frame forming a still image.

4. The method of claim 2, wherein said selected presentation in MPEG digital video format is an MPEG P-frame forming a data overlay.

5. The method of claim 2, wherein said step of multiplexing said presentation data stream into a single MPEG digital video transport stream with presentations requested by other users includes assigning a packet identification (PID), a program association table (PAT), a program map table (PMT), and a program clock reference (PCR) to said retrieved presentation, wherein one program clock reference (PCR) is used for multiple PIDS.

6. A system for interactive distribution of selectable presentations, said selectable presentations each comprising multiple data objects, including at least one constant data rate data object, at least one variable data rate data object, at least one control object, and at least one timing information object, said system comprising:

addressable processing equipment at a user location, said addressable processing equipment configured to transmit a request for a presentation;

a presentation preparation server operably connected to said addressable processing equipment configured to:

receive said request from said addressable processing equipment for a presentation and select and retrieve said presentation from a database of stored selectable presentations;

multiplex said multiple data objects into a presentation data stream by placing said data objects in at least one frame;

multiplex said presentation data stream with presentations requested by other users into a single MPEG digital video transport stream; and transmit said single-MPEG digital video transport stream to said addressable processing equipment with an address message indicating a location of said requested presentation in said single MPEG digital transport stream.

7. The system of claim 6 wherein said stored selectable presentations are converted to MPEG digital video format and stored in a presentation database memory.

8. The system of claim 7, wherein said selected presentation in MPEG digital video format is an MPEG I-frame forming a still image.

9. The system of claim 7, wherein said selected presentation in MPEG digital video format is an MPEG P-frame forming a data overlay.

10. The system of claim 7, wherein said selected presentation in MPEG digital video format is a group of pictures sequence including at least one MPEG I-frame and one or more MPEG P-frames forming a video sequence.

11. The method of claim 1 wherein said multiplexing of said multiple data objects into a presentation data stream comprises multiplexing said data objects into said presentation data stream such that said constant data rate data objects are transmitted at a constant data rate in said presentation data stream.

12. The method of claim 11 wherein said constant data rate data objects comprise audio data.

13. The method of claim 11 wherein said multiplexing of said multiple data objects into a presentation data stream comprises multiplexing said variable data rate objects into said presentation data stream such that said variable data rate data objects are transmitted at a variable data rate.

14. The system of claim 6 wherein said multiplexing of said multiple data objects into a presentation data stream comprises multiplexing said data objects into said presentation data stream such that said constant data rate data objects are transmitted at a constant data rate in said presentation data stream.

15. The system of claim 14 wherein said constant data rate data objects comprise MPEG audio data.

16. The system of claim 14 wherein said multiplexing of said multiple data objects into a presentation data stream comprises multiplexing said variable data rate objects into said presentation data stream such that said variable data rate data objects are transmitted at a variable data rate.

17. The system of claim 6 wherein said placing of said data objects into a frame comprises inserting said data objects into said frame hierarchically in the following order:
    control data objects;
    timing information objects;
    data rate objects; and
    data rate objects.

* * * * *